(12) United States Patent
Choi et al.

(10) Patent No.: US 11,984,126 B2
(45) Date of Patent: May 14, 2024

(54) DEVICE FOR RECOGNIZING SPEECH INPUT OF USER AND OPERATING METHOD THEREOF

(71) Applicant: SAMSUNG ELECTRONICS CO., LTD., Suwon-si (KR)

(72) Inventors: Hyungtak Choi, Suwon-si (KR); Jongyoub Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 17/439,247

(22) PCT Filed: Aug. 10, 2021

(86) PCT No.: PCT/KR2021/010574
§ 371 (c)(1),
(2) Date: Sep. 14, 2021

(87) PCT Pub. No.: WO2022/035183
PCT Pub. Date: Feb. 17, 2022

(65) Prior Publication Data
US 2022/0310096 A1    Sep. 29, 2022

(30) Foreign Application Priority Data

Aug. 12, 2020    (KR) .................. 10-2020-0101406

(51) Int. Cl.
*G10L 15/26* (2006.01)
*G06F 40/279* (2020.01)
(Continued)

(52) U.S. Cl.
CPC ............ *G10L 15/26* (2013.01); *G06F 40/279* (2020.01); *G10L 15/063* (2013.01); *G10L 25/51* (2013.01)

(58) Field of Classification Search
CPC ....... G10L 15/26; G10L 15/063; G10L 15/10; G10L 15/14; G10L 15/18; G10L 15/22;
(Continued)

(56) References Cited

U.S. PATENT DOCUMENTS 6,219,645 B1    4/2001  Byers
6,615,178 B1 *  9/2003  Tajima .................. G06F 40/205
                                                      704/277
(Continued)

FOREIGN PATENT DOCUMENTS

JP    2004-251998    9/2004
JP       4538954     7/2010
(Continued)

OTHER PUBLICATIONS

International Search Report and Written Opinion dated Nov. 8, 2021 in corresponding International Application No. PCT/KR2021/010574.

*Primary Examiner* — Yogeshkumar Patel
(74) *Attorney, Agent, or Firm* — Nixon & Vanderhye P.C.

(57) ABSTRACT

A device for recognizing a speech input and an operating method thereof are provided. The device may be configured to: obtain one or more text candidates comprising a character string in which it is predicted that the speech input is to be converted by recognizing a speech input using an automatic speech recognition (ASR) model; extract text history information corresponding to the speech input from a database by comparing the speech input with a plurality of speech signals previously stored in the database; and perform training to adjust a weight of each of the one or more text candidates using the extracted text history information. Also, a method in which the device recognizes a speech input using an AI model may be performed.

13 Claims, 9 Drawing Sheets

(51) Int. Cl.
*G10L 15/06* (2013.01)
*G10L 25/51* (2013.01)

(58) Field of Classification Search
CPC ... G10L 25/51; G10L 15/1822; G10L 15/183; G10L 15/02; G10L 15/16; G10L 15/25; G10L 25/30; G10L 40/279; G10L 2015/0635; G10L 2015/226; G10L 2015/228; G06F 40/279
See application file for complete search history.

(56) References Cited

U.S. PATENT DOCUMENTS

| | | |
|---|---|---|
| 7,415,326 B2 | 8/2008 | Komer et al. |
| 9,208,777 B2 | 12/2015 | Yao et al. |
| 9,355,123 B2 | 5/2016 | Wnuk et al. |
| 9,449,594 B2 | 9/2016 | Kurylo et al. |
| 9,870,765 B2 | 1/2018 | Kurata et al. |
| 10,089,978 B2 | 10/2018 | Kurata et al. |
| 10,424,317 B2 | 9/2019 | Parada et al. |
| 10,504,510 B2 | 12/2019 | Georges et al. |
| 11,100,916 B2 | 8/2021 | Lee |
| 2014/0025374 A1 | 1/2014 | Lou |
| 2018/0342234 A1 | 11/2018 | Kurata et al. |
| 2019/0228764 A1* | 7/2019 | Taki ................ G06F 40/289 |
| 2020/0160838 A1* | 5/2020 | Lee .................. G10L 15/26 |
| 2020/0193967 A1* | 6/2020 | Matsoukas .......... G10L 15/30 |

FOREIGN PATENT DOCUMENTS

| | | |
|---|---|---|
| JP | 2020-16784 | 1/2020 |
| KR | 10-2020-0059703 | 5/2020 |
| WO | 2018/043137 | 3/2018 |

* cited by examiner

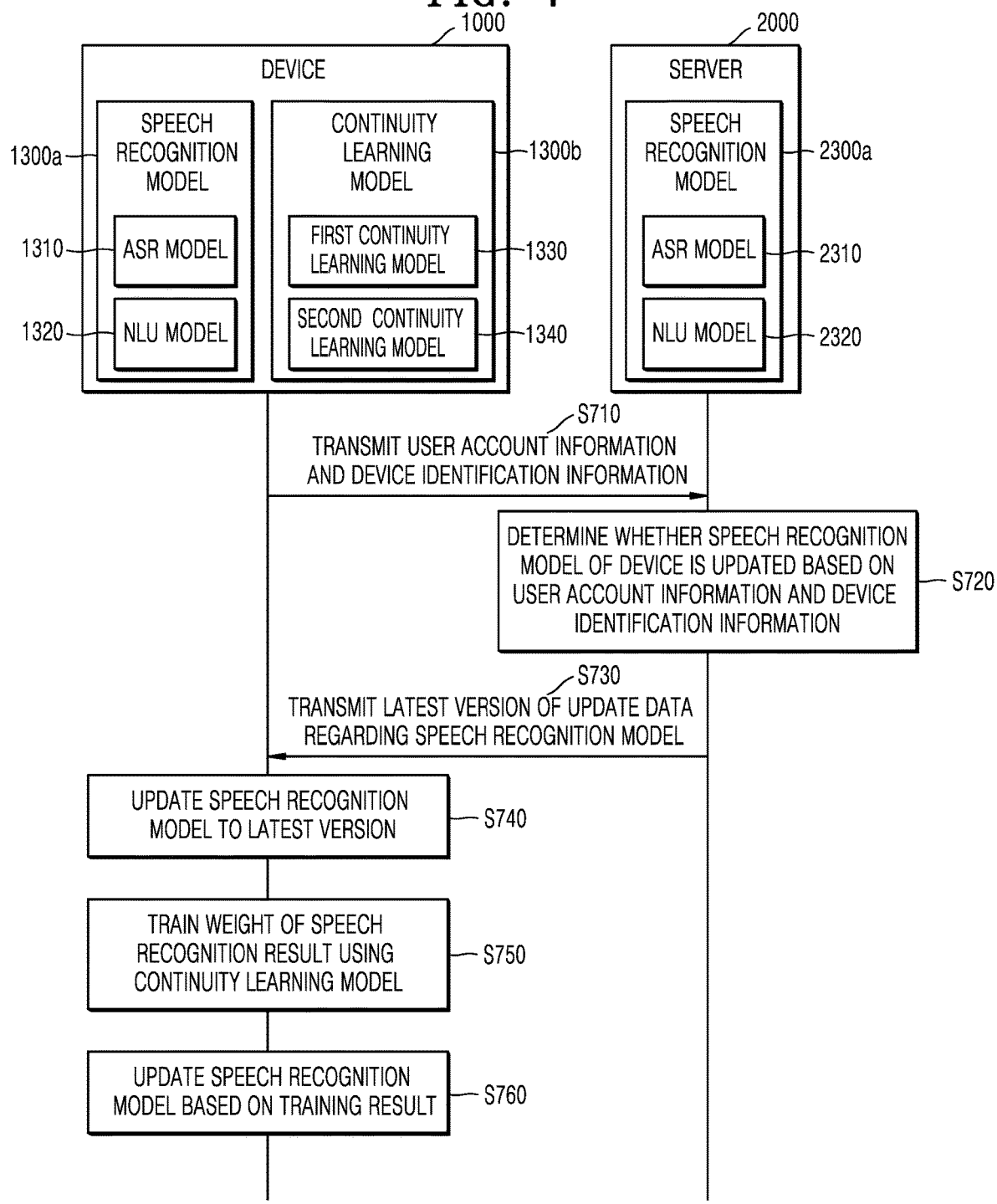

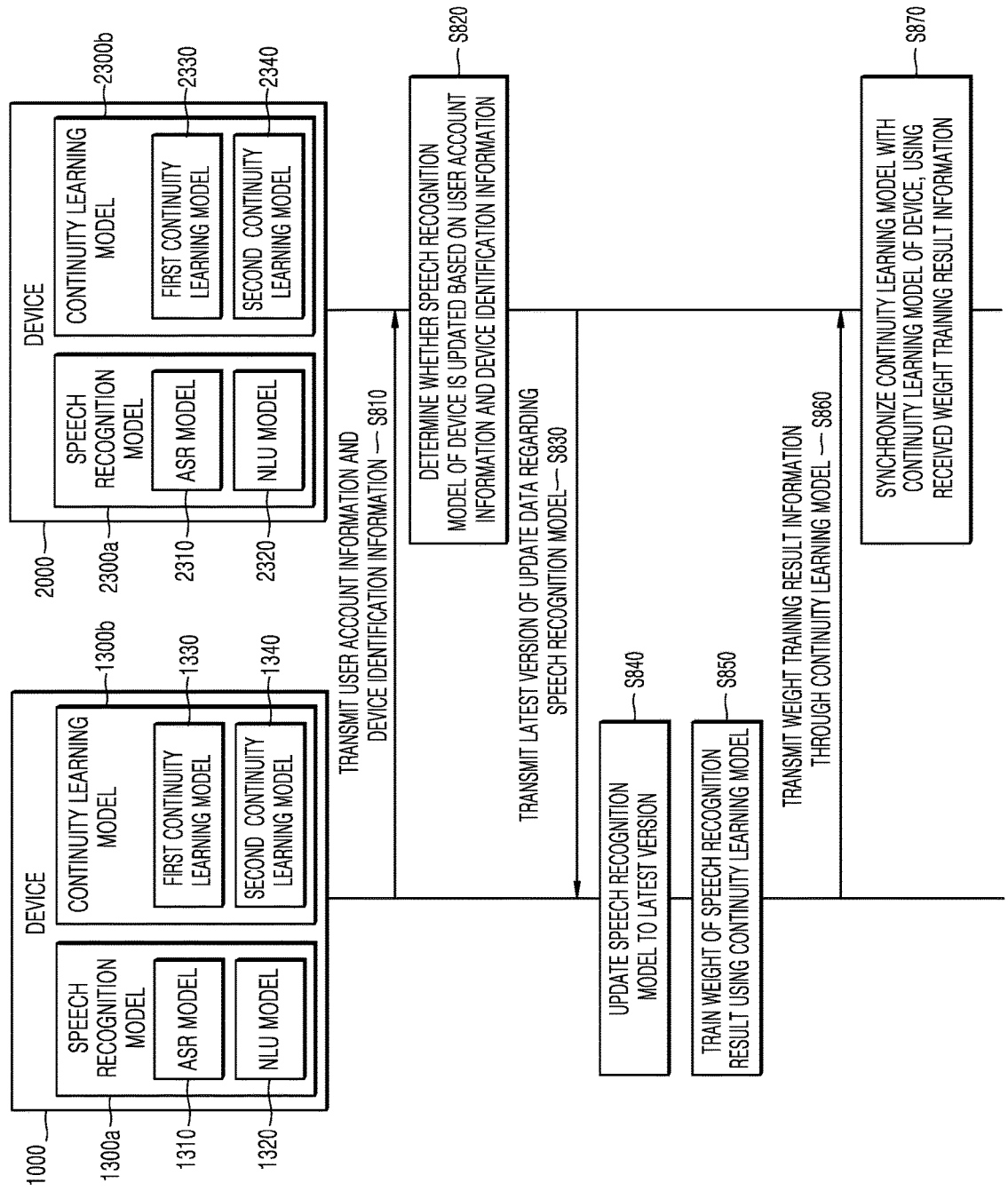

DEVICE FOR RECOGNIZING SPEECH INPUT OF USER AND OPERATING METHOD THEREOF

This application is the U.S. national phase of International Application No. PCT/KR2021/010574 filed Aug. 10, 2021 which designated the U.S. and claims priority to KR Patent Application No. 10-2020-0101406 filed Aug. 12, 2020, the entire contents of each of which are hereby incorporated by reference.

TECHNICAL FIELD

The disclosure relates to a device for recognizing a speech input received from a user using an artificial intelligence model, and an operating method thereof.

BACKGROUND ART

Speech recognition is a function of easily controlling a device by recognizing a speech input of a user without use of a separate button operation or contact with a touch module. Recently, with the development of artificial intelligence (AI) technology, AI technology is also applied to speech recognition, which enables quick and accurate speech recognition with respect to various utterances.

In a method of recognizing a speech input of a user using AI technology, a speech signal, which is an analog signal, may be received through a microphone, and a speech part may be converted into computer-readable text using an automatic speech recognition (ASR) model. The ASR model may be an AI model. The AI model may be processed by an AI-only processor designed in a hardware structure specialized for processing the AI model. The AI model may be created through training. Creating the AI model through training refers, for example, to a basic AI model being trained using a plurality of training data by a learning algorithm so that a predefined operation rule or AI model set to perform a wanted characteristic (or purpose) is created. The AI model may include a plurality of neural network layers. Each of the plurality of neural network layers has a plurality of weight values, and may perform a neural network operation using an operation result of a previous layer and an operation between the plurality of weight values.

A device receives a new model from a server or updates the existing speech recognition model in order to improve the performance of speech recognition using the AI model. When the new speech recognition model is downloaded or the existing speech recognition model is updated, even though the user utters something using the same voice, pronunciation, intonation, accent, tone, or dialect, there is a problem in that the speech recognition model does not accurately recognize the speech input of the user or outputs recognition results different from previous results. In this case, the device performs an operation or a function different from a previous operation or function, and the user experiences inconvenience because the device does not operate or perform a function as before.

DESCRIPTION OF EMBODIMENTS

Technical Problem

Embodiments of the disclosure provide a device that recognizes and interprets a speech input of a user and outputs a speech recognition result through training using a database that stores history information of speech recognition at a past time before the user utters and an operating method thereof.

Solution to Problem

According to an example embodiment of the disclosure, a method in which a device recognizes a speech input includes: receiving the speech input; obtaining one or more text candidates comprising a character string in which it is predicted that the speech input is to be converted by recognizing the speech input using an automatic speech recognition (ASR) model; extracting text history information corresponding to the speech input from a database by comparing the speech input with speech recognition result history information recognized before a time the speech input is received and previously stored in the database; and performing training to adjust a weight of each of the one or more text candidates using the extracted text history information.

The database may store the speech recognition result history information comprising a plurality of speech signals previously obtained and a plurality of text history information obtained by converting the plurality of speech signals using the ASR model, and the plurality of speech signals may be paired with the plurality of corresponding text history information and stored in the database.

The extracting of the text history information corresponding to the speech input may include calculating a similarity between the speech input and each of the plurality of speech signals; identifying a speech signal for which the calculated similarity exceeds a preset or specified threshold among the plurality of speech signals; and extracting text history information paired with the identified speech signal from among the plurality of text history information.

The method may further include determining, through the training, a text output by converting the speech input.

The method of may further include obtaining at least one text interpretation result candidate by interpreting the output text using a natural language understanding (NLU) model; extracting text interpretation history information corresponding to the text from among a plurality of text interpretation result history information, by comparing the obtained at least one text interpretation result candidate with the plurality of text interpretation result history information previously stored in the database; training a weight for obtaining text interpretation result information from the text through the NLU model, using the extracted text interpretation history information; and updating the NLU model using a result of the training.

The text interpretation result information may include at least one of information about a domain, an intent, or a named entity recognized by interpreting the text using the NLU model.

The database may store a plurality of texts previously obtained and a plurality of text interpretation history information obtained by interpreting the plurality of texts using the NLU model, and the plurality of texts may be paired with the plurality of corresponding text interpretation history information and stored in the database.

The extracting of the text interpretation history information corresponding to the text may include calculating a similarity between the text and each of the plurality of texts previously stored in the database; identifying a text for which the calculated similarity exceeds a specified threshold among the plurality of texts; and extracting the text interpretation history information paired with the identified text from among the plurality of text interpretation history information.

The method of may further include updating the ASR model that determines a text output by transforming the speech input through training to adjust the weight; and transmitting update information of the ASR model to a server.

According to an example embodiment of the disclosure, a device for recognizing a speech input includes: a speech input interface comprising circuitry configured to receive the speech input; a database storing speech recognition result history information comprising a plurality of speech signals received before a time the speech input is received and a plurality of text history information respectively corresponding to the plurality of speech signals; a memory storing a program comprising one or more instructions; and a processor configured to execute the one or more instructions of the program stored in the memory, wherein the processor is configured to: receive the speech input from the speech input interface; obtain one or more text candidates comprising a character string in which it is predicted that the speech input is to be converted by recognizing the speech input using an automatic speech recognition (ASR) model; extract text history information corresponding to the speech input from a database by comparing the speech input with a plurality of speech signals previously stored in the database; and perform training to adjust a weight of each of the one or more text candidates using the extracted text history information.

The database may store the speech recognition result history information comprising a plurality of speech signals previously obtained and a plurality of text history information obtained by converting the plurality of speech signals using the ASR model, and the plurality of speech signals may be paired with the plurality of corresponding text history information and stored in the database.

The processor may be further configured to: calculate a similarity between the speech input and each of the plurality of speech signals previously stored in the database, identify a speech signal for which the calculated similarity exceeds a specified threshold among the plurality of speech signals; and extract text history information paired with the identified speech signal from among the plurality of text history information.

The processor may be further configured to determine, through the training, a text output by converting the speech input.

The processor may be further configured to obtain at least one text interpretation result candidate by interpreting the output text using a natural language understanding (NLU) model; extract text interpretation history information corresponding to the text from among a plurality of text interpretation result history information by comparing the obtained at least one text interpretation result candidate with the plurality of text interpretation result history information previously stored in the database; train a weight for obtaining text interpretation result information from the text through the NLU model using the extracted text interpretation history information; and update the NLU model using a result of the training.

The text interpretation result information may include at least one of information about a domain, an intent, or a named entity recognized by interpreting the text using the NLU model.

The database may store a plurality of texts previously obtained and a plurality of text interpretation history information obtained by interpreting the plurality of texts using the NLU model, and the plurality of texts may be paired with the plurality of corresponding text interpretation history information and stored in the database.

The processor may be further configured to: calculate a similarity between the text and each of the plurality of texts previously stored in the database; identify a text for which the calculated similarity exceeds a specified threshold among the plurality of texts; and extract the text interpretation history information paired with the identified text from among the plurality of text interpretation history information.

The processor may be further configured to determine the text interpretation result information output from the NLU model through training to use the extracted text interpretation history information.

The device may further include a communication interface comprising communication circuitry configured to perform data communication with a server, and the processor may be further configured to update the ASR model that determines a text output by transforming the speech input through training to adjust the weight; and control the communication interface to transmit update information of the ASR model to the server.

According to an example embodiment of the disclosure, a non-transitory computer-readable recording medium may have recorded thereon a program to be executed on a computer.

BRIEF DESCRIPTION OF DRAWINGS

The above and other aspects, features and advantages of certain embodiments of the present disclosure will be more apparent from the following detailed description, taken in conjunction with the accompanying drawings, in which:

FIG. 7 is a signal flow diagram illustrating an example method of operating a device and a server according to various embodiments; and FIG. 8 is a signal flow diagram illustrating an example method of operating a device and a server according to various embodiments.

MODE OF DISCLOSURE

Cross-Reference to Related Applications

Figure 1:
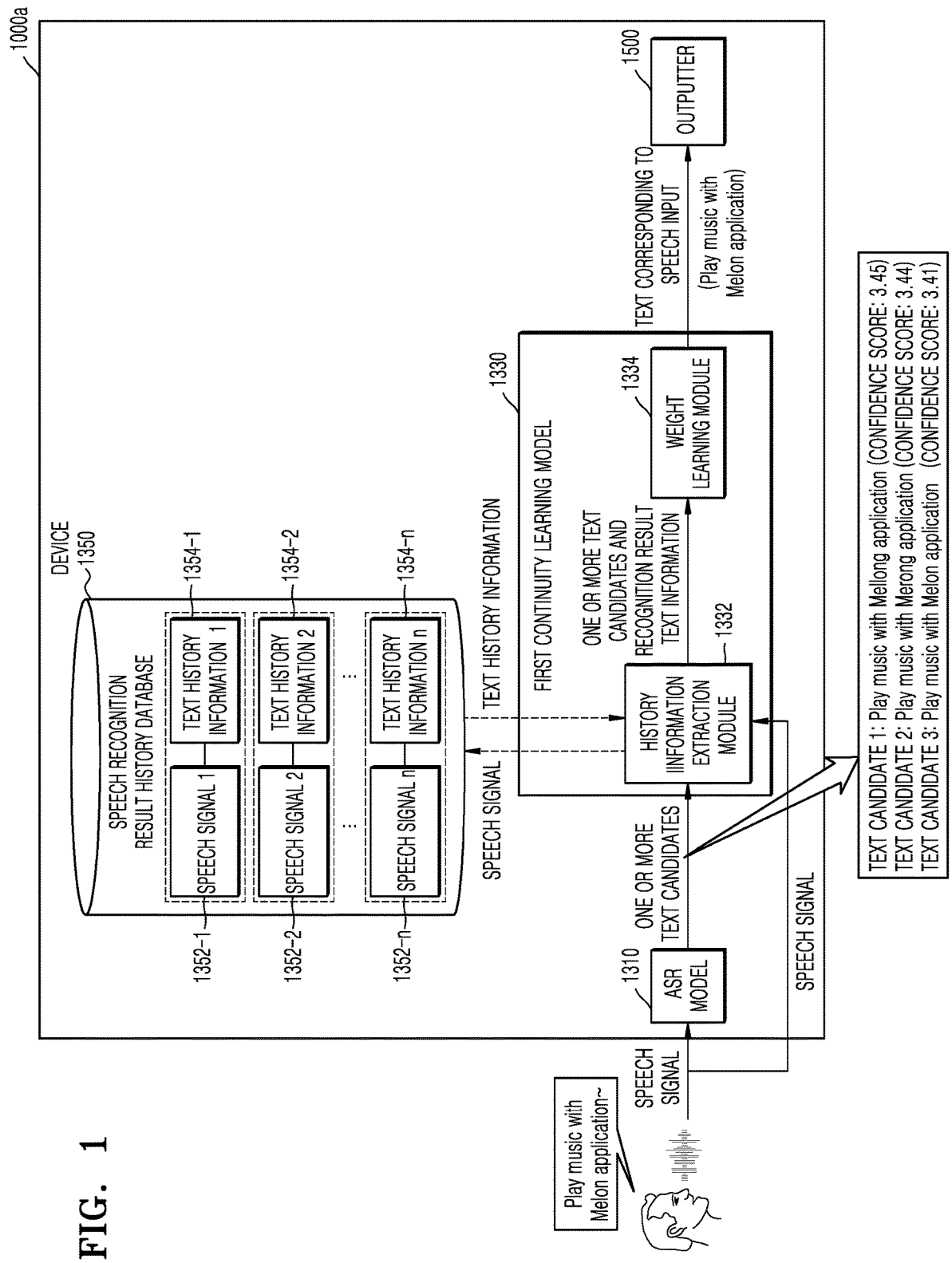
FIG. 1 is a diagram illustrating an example operation in which a device recognizes a speech input of a user and outputs a text according to various embodiments.

This application is a national stage of International Application No. PCT/KR2021/010574 designating the United States, filed on Aug. 10, 2021, in the Korean Intellectual Property Receiving Office and claiming priority to Korean Patent Application No. 10-2020-0101406, filed on Aug. 12, 2020 in the Korean Intellectual Property Office, the disclosures of which are incorporated by reference herein in their entireties.

Throughout the disclosure, the expression "at least one of a, b or c" indicates only a, only b, only c, both a and b, both a and c, both b and c, all of a, b, and c, or variations thereof.

Although terms used in describing various example embodiments of the disclosure are selected from among general terms popularly used at present under the consideration of functions in the disclosure, the terms may vary according to the intention of those of ordinary skill in the art, judicial precedents, or introduction of new technology. In addition, in a specific case, terms may be arbitrarily selected, and in this case, the meaning of the terms is disclosed in a corresponding description part of the disclosure. Thus, the terms used in the disclosure should be defined not by the simple names of the terms but by the meaning of the terms and the contents throughout the disclosure.

It is to be understood that a singular form of a noun corresponding to an item may include one or more of the things, unless the relevant context clearly indicates otherwise. All of the terms used herein including technical or scientific terms have the same meanings as those generally understood by those of ordinary skill in a technical field described in the disclosure.

Throughout the entirety of the disclosure, when it is assumed that a certain part includes a certain component, the term 'including' means that a corresponding component may further include other components unless a specific meaning opposed to the corresponding component is written. The term used in the disclosure such as "unit" or "module" indicates a unit for processing at least one function or operation, and may be implemented in hardware, software, or in a combination of hardware and software.

An expression "configured (or set) to" used in the disclosure may be replaced with, for example, "suitable for," "having the capacity to," "designed to," "adapted to," "made to," or "capable of" according to a situation. The term "configured to (or set)" does not always refer only to "specifically designed to" by hardware. Alternatively, in some situation, an expression "apparatus configured to" may refer to the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that may perform a corresponding operation by executing at least one software program stored in a memory.

In the disclosure, the 'character' may refer, for example, to a symbol used to express and write human language in a form that may be seen to the eye. For example, the character may include Hangul, alphabets, Chinese characters, numbers, diacritics, punctuation marks, and other symbols.

In the disclosure, the 'character string' may refer, for example, to a sequence of characters.

In the disclosure, the 'grapheme' may refer to the smallest unit including at least one character and expressing sound. For example, in the case of an alphabetic writing system, one character may be a grapheme, and the character string may refer to a sequence of graphemes.

In the disclosure, the 'text' may include at least one grapheme. For example, the text may include morphemes or words.

In the disclosure, the 'word' may refer to a basic unit of a language including at least one character string, used independently, or indicating a grammatical function.

In the disclosure, the 'word sequence' may refer, for example, to a sequence of one or more words.

In the disclosure, when a speech recognition model outputs a character string from a speech signal, the "confidence score of a character string" may refer to a degree of how accurately the speech recognition model that outputs a certain character string performs speech recognition. For example, the confidence score of the character string may be calculated according to a specified mathematical equation based on a likelihood obtained from a certain character string, a partial likelihood output in a process of estimating the certain character string, or a posterior probability value. As the confidence score of the character string increases, it may be determined that the speech recognition model accurately estimates a character string with respect to a speech signal.

In the disclosure, the 'automatic speech recognition (ASR) model' may refer to a speech recognition model that recognizes a user's speech, and is a model trained to convert a speech input received from the user into a text and output the converted text. In an embodiment of the disclosure, the ASR model may be an artificial intelligence (AI) model including, for example, and without limitation, a sound model, a pronunciation dictionary, and a language model. In another embodiment of the disclosure, the ASR model may be an end-to-end speech recognition model having a structure including an integrated neural network without separately including the sound model, the pronunciation dictionary, and the language model. The end-to-end ASR model may use the integrated neural network to convert the speech signal into the text without a process of converting a phoneme into the text after recognizing the phoneme from the speech signal.

In the disclosure, the 'natural language understanding (NLU)' may refer, for example, to a model trained to interpret a text converted from a speech signal to obtain a domain and an intent corresponding to the text. The NLU model may identify information about a slot as well as the domain and the intent by interpreting the text.

In the disclosure, the 'domain' may refer, for example, to a category or a region related to a user's intention identified by interpreting the text. The domain may be detected by interpreting the text using the NLU model. The domain may be related to the intent detected from the text using the NLU model. In an embodiment of the disclosure, domains may be classified according to text-related services. The domain may include one or more regions, such as a category to which the text corresponds, for example, a movie domain, a music domain, a book domain, a game domain, an aviation domain, a food domain, and a sports domain.

In the disclosure, the 'intent' may refer, for example, to information indicating the user's intention determined by interpreting the text. The intent may include information indicating the user's intention to utter, and may include information indicating an action or function that the user intends to execute using the device. The intent may be determined by interpreting the text using the NLU model For example, when the text converted from the speech input of the user is "Play music with Melon application~", the domain may be 'music' and the intent may be 'music content play'. The intent may include an intent action and an intent object.

The intent may include not only information indicating a user's utterance intention (hereinafter, intention information), but also a numerical value corresponding to information indicating the user's intention. The numerical value may refer, for example, to a probability value that the text is related to information indicating a specific intention, and may indicate a confidence score at which the text may be interpreted as the specific intention. As a result of analyzing the text using the NLU model, when a plurality of information indicating the user's intention are obtained, intention information having a maximum numerical value corresponding to each intention information may be determined as the intent.

In the disclosure, the 'slot' may refer, for example, to variable information for obtaining detailed information related to the intent or determining a detailed operation. In an embodiment of the disclosure, the variable information of the slot may include a named entity.

A slot may include information related to an intent, and a plurality of types of slots may correspond to one intent. The slot may include a numerical value indicating a probability value that the text is to be related to specific variable information. In an embodiment of the disclosure, as a result of analyzing the text using the NLU model, a plurality of variable information indicating the slot may be obtained. In this case, variable information having a maximum numerical value corresponding to each variable information may be determined as the slot. For example, when the text is 'Play music with Melon application~', the slot obtained from the text may be a 'Melon application'.

The domain, the intent, and the slot may be automatically identified or detected using the NLU model, but are not limited thereto. In an embodiment of the disclosure, the domain, the intent, and the slot may be manually designated or determined by a user input entered through a device.

FIG. 1 is a diagram illustrating an example operation in which a device 1000a recognizes a speech input of a user and outputs a text according to various embodiments.

Referring to FIG. 1, the device 1000a may include an ASR model (e.g., including various processing circuitry and/or executable program instructions) 1310, a first continuity learning model (e.g., including various processing circuitry and/or executable program instructions) 1330, a speech recognition result history database 1350, and an outputter (e.g., including output circuitry) 1500. Components for describing the operation of the device 1000a are illustrated in FIG. 1. The configuration included in the device 1000a is not limited to that shown in FIG. 1.

The device 1000a may receive a speech input from a user. In an embodiment of the disclosure, the device 1000a may receive the speech input (e.g., a user's utterance) from the user using a speech input interface 1100 (refer to FIG. 4) such as a microphone, and obtain a speech signal from the received speech input. The speech signal may be in the form of a wave file, but is not limited thereto. In the embodiment of the disclosure shown in FIG. 1, the device 1000a may receive a speech signal related to a user's utterance, "Play music with Melon application".

The ASR model 1310 may include a speech recognition model recognizing a user's speech, and may include a model trained to convert a speech signal received from the user into a text and output the converted text. In an embodiment of the disclosure, the ASR model 1310 may be an AI model including a sound model, a pronunciation dictionary, and a language model. However, the disclosure is not limited thereto, and the ASR model 1310 may be an end-to-end speech recognition model having a structure including an integrated deep neural network (DNN) without separately including the pronunciation dictionary and the language model. An end-to-end ASR method may refer, for example, to a speech recognition method using a DNN trained to directly map a speech signal to a character string or word string. Unlike other speech recognition methods that use multiple models, such as the sound model and the language model, the end-to-end ASR method may simplify a speech recognition process using a single trained DNN. Sub-embodiments of the end-to-end ASR model 1310 include, for example, an RNN-T model and a connectionist temporal classification (CTC) model.

The device 1000a may convert the speech signal into the text using instructions or a program code related to the ASR model 1310. In an embodiment of the disclosure, the ASR model 1310 may convert the speech signal into the text including a plurality of character strings synchronized in units of frames. Here, the 'frame' may refer to a unit in which a speech signal is divided at a regular time interval for processing of the speech signal, or the divided speech signal itself. The 'frame-synchronized character string' may refer, for example, to a character string including characters individually corresponding to frames of the speech signal when the speech signal is converted and output into the character string by the ASR model 1310.

The ASR model 1310 may output one or more text candidates including the plurality of character strings based on a confidence score indicating a probability value that the speech signal may be predicted as the plurality of frame-synchronized character strings. The 'confidence score of the character string' indicates a degree of how accurately the ASR model 1310 that outputs a certain character string recognizes the speech signal. For example, the confidence score of the character string may be calculated according to a preset or specified mathematical equation based on a likelihood obtained from a certain character string, a partial likelihood output in a process of estimating the certain character string, or a posterior probability value. In an embodiment of the disclosure, the one or more text candidates output by the ASR model 1310 by recognizing the speech signal may be an N-Best candidate having a confidence score exceeding a specified threshold. For example, the one or more text candidates may include three text candidates of a first text candidate including a character string "Play music with Mellong application", a second text candidate including a character string "Play music with Merong application", and a third text candidate including a character string "Play music with Melon application". Also, for example, a confidence score of the first text candidate may be 3.45, a confidence score of the second text candidate may be 3.44, and a confidence score of the third text candidate may be 3.41. However, this is only an example for convenience of description, and is not limited thereto. The one or more text candidates may be prioritized according to a confidence score. For example, because the confidence score of the first text candidate is 3.45, the ASR model 1310 may determine the first text candidate as a text corresponding to the speech input received from the user.

The ASR model 1310 provides the one or more text candidates converted and output from the speech signal to the first continuity learning model 1330.

The first continuity learning model 1330 may refer to a model trained to determine a text corresponding to the speech signal by comparing the speech signal received from the user and the one or more text candidates received from the ASR model 1310 with speech recognition result history information previously stored in the speech recognition result history database 1350. The first continuity learning model 1330 may include a history information extraction module (e.g., including various processing circuitry and/or executable program instructions) 1332 and a weight learning module (e.g., including various processing circuitry and/or executable program instructions) 1334.

The history information extraction module 1332 may refer to a module configured to compare the speech signal received from the user with a speech signal previously stored in the speech recognition result history database 1350, and, based on results of comparison, extract previously converted text history information in correspondence to the speech signal.

The speech recognition result history database 1350 may refer to a database that stores the speech signal previously obtained before a time when the speech input is received from the user and the history information of the text obtained by converting the speech signal. In an embodiment of the disclosure, the speech recognition result history database 1350 may store a plurality of speech signals 1352-1 to 1352-*n* received at a past time and a plurality of text history information 1354-1 to 1354-*n* output by respectively converting the plurality of speech signals 1352-1 to 1352-*n* through training using the ASR model 1310. In an embodiment of the disclosure, the plurality of speech signals 1352-1 to 1352-*n* may be paired with the plurality of corresponding text history information 1354-1 to 1354-*n* and stored in the speech recognition result history database 1350.

The plurality of speech signals 1352-1 to 1352-*n* may be in the form of a wave file. However, the disclosure is not limited thereto, and the speech signal may be stored in the speech recognition result history database 1350 in the form of a binary data file encoded in binary format.

In an embodiment of the disclosure, when the device 1000*a* is a user-only or a terminal that may be used only by a limited user, the plurality of text history information 1354-1 to 1354-*n* may be history information obtained by converting, into the text, the plurality of speech signals 1352-1 to 1352-*n* obtained from a speech input uttered by the user of the device 1000*a* at a past time using the ASR model 1310. In this case, the speech recognition result history database 1350 may perform a function or operation of a customized and personalized language dictionary based on language characteristics of the user of the device 1000*a*, for example, age, gender, pronunciation (e.g., British English, American English, Australian English, etc. in the case of English), intonation, and dialect.

The history information extraction module 1332 may measure similarity between the speech signal received from the user and the plurality of speech signals 1352-1 to 1352-*n* previously stored in the speech recognition result history database 1350. In an embodiment of the disclosure, the history information extraction module 1332 may measure the similarity between the speech signal received from the user and the plurality of speech signals 1352-1 to 1352-*n* previously stored in the speech recognition result history database 1350 using a cosine similarity measurement method. However, the disclosure is not limited thereto, and the history information extraction module 1332 may measure the similarity between the speech signal received from the user and the plurality of speech signals 1352-1 to 1352-*n* previously stored in the speech recognition result history database 1350 using a known similarity measurement algorithm or method.

The history information extraction module 1332 may identify a speech signal for which the measured similarity exceeds a specified threshold among the plurality of speech signals 1352-1 to 1352-*n* and extract the text history information corresponding to the identified speech signal. For example, the history information extraction module 1332 may measure similarity between the speech signal "Play music with Melon application" received from the user and the plurality of speech signals 1352-1 to 1352-1 previously stored in the speech recognition result history database 1350, and identify the second speech signal 1352-2 in which the measured similarity exceeds the specified threshold. The history information extraction module 1332 may extract the second text history information 1354-2 forming a pair with the second speech signal 1352-2 from the speech recognition result history database 1350. The second text history information 1354-2 is output text converted by recognizing the second speech signal 1352-2 of the user at a past time, and may include the character string, for example, "Play music with Melon application".

The history information extraction module 1332 may compare the one or more text candidates received from the ASR model 1310 with the text history information extracted from the speech recognition result history database 1350 to determine whether the one or more text candidates and the text history information are the same. When the one or more text candidates output from the ASR model 1310 and the text history information extracted from the speech recognition result history database 1350 are not the same, the history information extraction module 1332 may provide the one or more text candidates and the extracted text history information to the weight learning module 1334.

The weight learning module (e.g., including various processing circuitry and/or executable program instructions) 1334 may refer to a module configured to train a weight that determines the text corresponding to the speech input received from the user using the text history information extracted from the speech recognition result history database 1350. In an embodiment of the disclosure, the weight learning module 1334 may include a DNN model that receives a speech signal, outputs a text, and includes a plurality of neural network layers. Each of the plurality of neural network layers has a plurality of weight values, and may perform a neural network operation using an operation result of a previous layer and an operation between the plurality of weight values. The weight learning module 1334 may include at least one of, for example, and without limitation, a convolutional neural network model (CNN), a recurrent neural network model (RNN), a Restricted Boltzmann Machine (RBM), a Deep Belief Network (DBN), a Bidirectional Recurrent Deep Neural Network (BRDNN), Deep Q-Networks, etc., but is not limited to the above-described examples. In an embodiment of the disclosure, the weight learning module 1334 may determine the text history information extracted by the history information extraction module 1332 as a ground truth with respect to the speech input received from the user and perform training to add a high weight. The weight learning module 1334 may update the output of the ASR model 1310 by determining the output text of the ASR model 1310 using the extracted text history information.

For example, the weight learning module 1334 may determine the third text candidate that is the same as the second text history information 1354-2 among the one or more text candidates as the text corresponding to the speech input through training to add a high weight to the second text history information 1354-2 extracted from the history information extraction module 1332. The third text candidate has the confidence score of 3.41, which is lower than the confidence scores of the first text candidate and the second text candidate, but may be determined as the text corresponding to the speech input according to results of training by the weight learning module 1334.

The weight learning module 1334 provides the determined text to the outputter 1500. The outputter 1500 includes a display 1510 (see FIG. 4) and a speaker 1520 (see FIG. 4), and may output the text received from the weight learning module 1334 as a user interface or a sound signal.

In speech recognition performed by the device 1000*a*, the speech recognition model such as the ASR model 1310 may be periodically updated from an external server so as to improve performance thereof. When the speech recognition model is updated, even though users pronounce the same as before, a problem in that the speech recognition model understands differently from before or performs an operation or a function different from before may occur. Even when the performance of the speech recognition model is updated, users want the speech recognition model to train, understand, operate, and respond to their voices, pronunciations, intonations, and dialects as they are.

The device 1000*a* according to an embodiment of the disclosure may store an existing speech signal of the user and the recognition result history information in the speech recognition result history database 1350, compare the output text candidate of the ASR model 1310 with the recognition result history information previously stored in the speech recognition result history database 1350, extract text history information corresponding to a speech input, and output the text with respect to the speech input through training to adjust a weight using the extracted text history information. Therefore, even when the performance of the ASR model 1310 is updated, the device 1000*a* of the disclosure may recognize the user's existing pronunciation, intonation, dialect, and gender-based voice, and provide a recognition result, thereby providing a user experience that maintains continuity. In addition, the device 1000*a* of the disclosure may recognize the user's existing pronunciation, intonation, dialect, and gender-based voice, store the previously obtained text history information in the speech recognition result history database 1350, and learn the weight used to determine the text corresponding to the speech input of the user using the stored text history information, thereby improving accuracy of speech recognition.

Figure 2A:
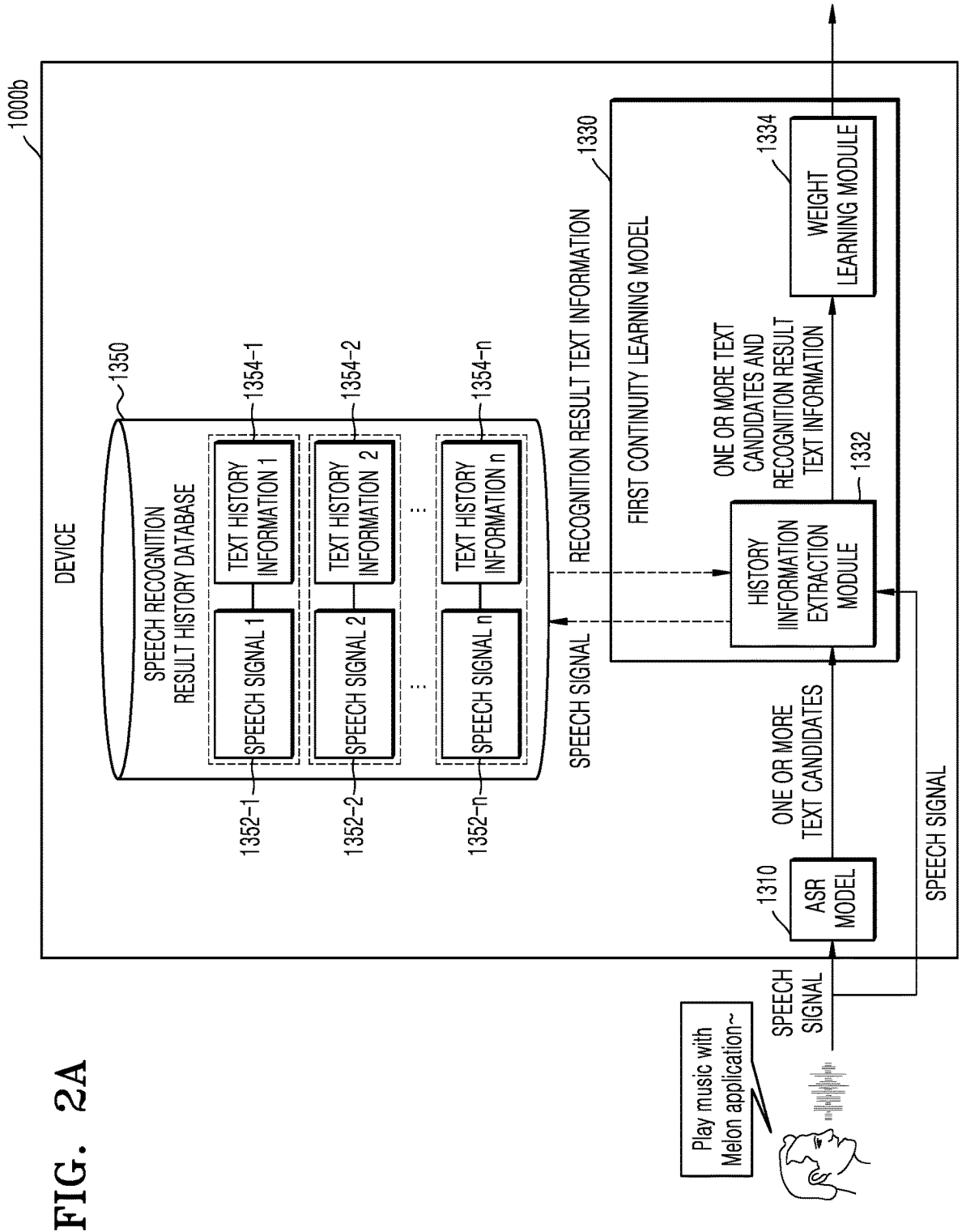
FIG. 2A is a diagram illustrating an example operation in which a device recognizes a speech input of a user and outputs a speech recognition result according to various embodiments.
Figure 2B:
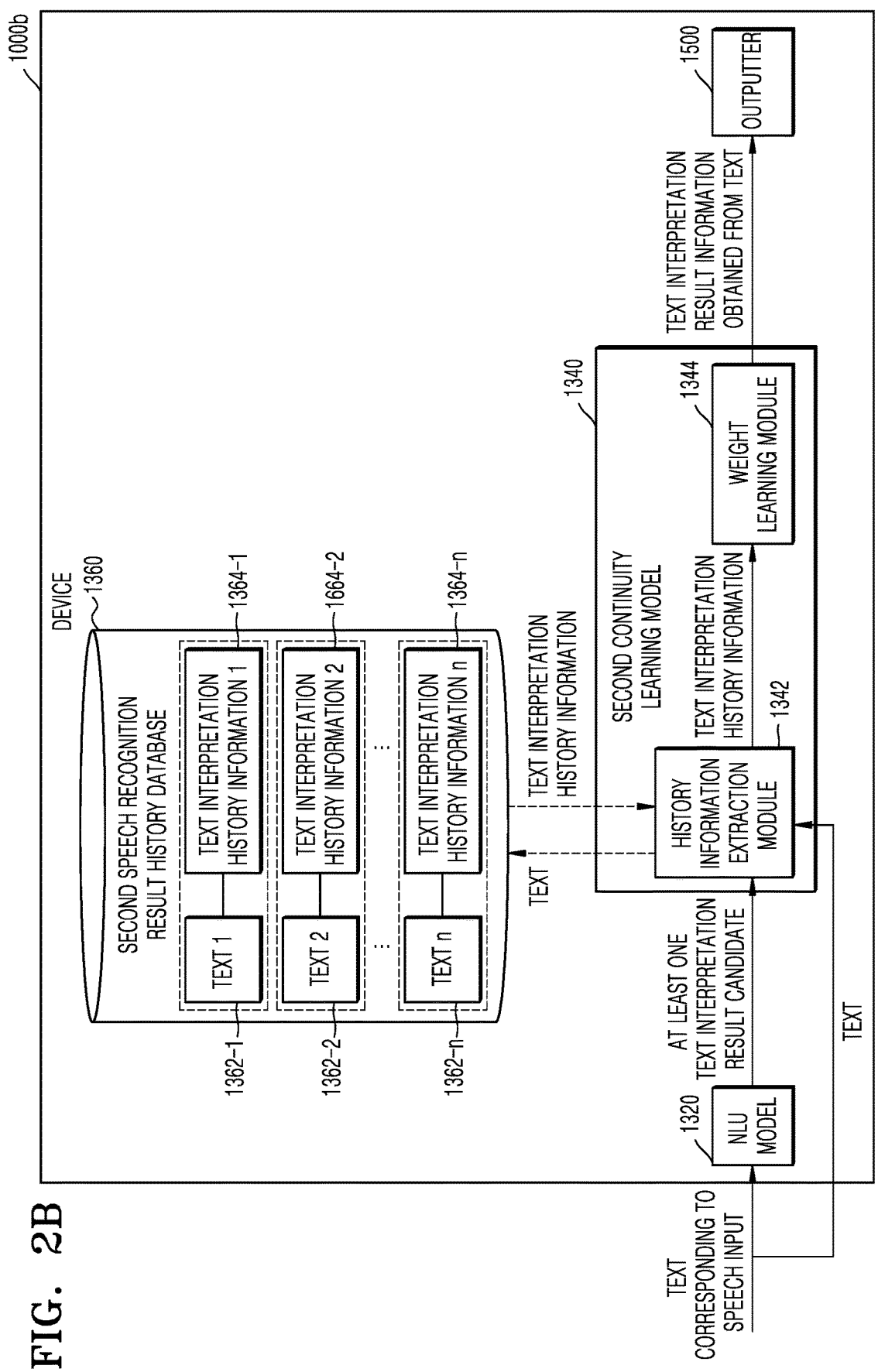
FIG. 2B is a diagram illustrating an example operation in which a device recognizes a speech input of a user and outputs a speech recognition result according to various embodiments.

FIGS. 2A and 2B are diagrams illustrating an example operation in which the device 1000*b* recognizes a speech input of a user and outputs a speech recognition result according to various embodiments.

Referring to FIGS. 2A and 2B, the device 1000*b* may include the ASR model (e.g., including various processing circuitry and/or executable program instructions) 1310, an NLU model (e.g., including various processing circuitry and/or executable program instructions) 1320, the first continuity learning model (e.g., including various processing circuitry and/or executable program instructions) 1330, a second continuity learning model (e.g., including various processing circuitry and/or executable program instructions) 1340, the first speech recognition result history database 1350, a second speech recognition result history database 1360, and the outputter 1500. Components for describing the operation of the device 1000*b* are illustrated in FIGS. 2A and 2B. The configuration included in the device 1000*b* is not limited to that shown in FIGS. 2A and 2B.

The ASR model 1310, the first continuity learning model 1330, and the first speech recognition result history database 1350 shown in FIG. 2A are the same as or similar to the ASR model 1310, the first continuity learning model 1330 and the first speech recognition result history database 1350 shown in FIG. 1, respectively, and thus the redundant descriptions may not be repeated here.

The NLU model 1320 is a model trained to obtain text interpretation result information by interpreting the text received from the first continuity learning model 1330. The text interpretation result information may include information about a domain, an intent, and a slot detected by interpreting the text. The text input to the NLU model 1320 may be a text corresponding to a speech input received from a user.

The NLU model 1320 may output at least one text interpretation result candidate by interpreting the text. In an embodiment of the disclosure, the at least one text interpretation result candidate may include, for example, and without limitation, at least one domain candidate, at least one intent candidate, and at least one slot candidate predicted from the text by interpreting the text using the NLU model 1320. For example, the NLU model 1320 may output the at least one domain candidate based on a probability value that a category or a region related to a user's intention identified by interpreting the text is predicted as a specific domain. As another example, the NLU model 1320 may output the at least one intent candidate based on a probability value that information indicating a user's utterance intention is predicted as a specific intent by interpreting the text. Also, the NLU model 1320 may output the at least one slot candidate based on a probability value that a detected named entity is predicted as a specific slot by interpreting the text. When a plurality of slots are detected from the text, the NLU model 1320 may output the at least one slot candidate with respect to each of the plurality of slots. Here, the 'probability value' may refer, for example, to a confidence score. In an embodiment of the disclosure, the at least one text interpretation result candidate output by the NLU model 1320 by interpreting the text may be an N-Best candidate having a confidence score exceeding a specified threshold.

The second continuity learning model 1340 is a model trained to determine the text interpretation result information corresponding to the text by comparing the text and the at least one text interpretation result candidate received from NLU model 1320 with speech recognition result history information previously stored in the second speech recognition result history database 1360. The second continuity learning model 1340 may include a history information extraction module 1342 and a weight learning module 1344.

The history information extraction module 1342 is a module configured to compare the text received from the first continuity learning model 1330 with a plurality of texts 1362-1 to 1362-*n* previously stored in the second speech recognition result history database 1360 and extract the previously obtained text interpretation history information in relation to the text based on a comparison result.

The second speech recognition result history database 1360 is a database that stores the previously obtained text output from the ASR model 1310 before a time when the speech input is received from the user and the text interpretation history information detected by interpreting the previously obtained text. The text interpretation history information may include history information about a domain, an intent, and a slot detected by interpreting the text. In an embodiment of the disclosure, the second speech recognition result history database 1360 may store the plurality of texts 1362-1 to 1362-*n* obtained at a past time and a plurality of text interpretation history information 1364-1 to 1364-*n* detected by interpreting the plurality of texts 1362-1 to 1362-n using the NLU model 1320. In an embodiment of the disclosure, the plurality of texts 1362-1 to 1362-n may be paired with the related plurality of text interpretation history information 1364-1 to 1364-n and stored in the second speech recognition result history database 1360.

The history information extraction module 1342 may measure similarity between the text received from the first continuity learning model 1330 and the plurality of texts 1362-1 to 1362-n previously stored in the second speech recognition result history database 1360. In an embodiment of the disclosure, the history information extraction module 1342 may measure the similarity between the text received from the first continuity learning model 1330 and the plurality of texts 1362-1 to 1362-n previously stored in the second speech recognition result history database 1360 using a cosine similarity measurement method. However, the disclosure is not limited thereto, and the history information extraction module 1342 may measure the similarity between the text received from the first continuity learning model 1330 and the plurality of texts 1362-1 to 1362-n previously stored in the second speech recognition result history database 1360 using, for example, and without limitation, a Jaccard similarity, Euclidean similarity, or Manhattan similarity measurement method or algorithm.

The history information extraction module 1342 may identify a text for which the measured similarity exceeds a specified threshold among the plurality of texts 1362-1 to 1362-n previously stored in the second speech recognition result history database 1360. The history information extraction module 1342 may extract text interpretation history information forming a pair with the identified text from the second speech recognition result history database 1360. For example, when a text identified to have the similarity with the text output from the first continuity learning model 1330 exceeding the specified threshold among the plurality of texts 1362-1 to 1362-n previously stored in the second speech recognition result history database 1360 is the second text 1362-2, the history information extraction module 1342 may extract the second text interpretation history information 1364-2 obtained by interpreting the second text 1362-2.

The history information extraction module 1342 may compare the at least one text interpretation result candidate output from the NLU model 1320 with the text interpretation history information extracted from the second speech recognition result history database 1360 to determine whether the at least one text interpretation result candidate and the text interpretation history information are the same. In an embodiment of the disclosure, the history information extraction module 1342 may sequentially determine the sameness according to the type of text interpretation result information. For example, the history information extraction module 1342 may determine whether the at least one text interpretation result candidate and the text interpretation history information are the same in the order of a domain, an intent, and a slot. For example, the history information extraction module 1342 may determine whether at least one domain candidate output from the NLU model 1320 and domain history information extracted from the second speech recognition result history database 1360 are the same, and when it is determined that the at least one domain candidate and the domain history information are the same, determine whether at least one intent candidate and intent history information extracted from the second speech recognition result history database 1360 are the same. After determining whether intents are the same, the history information extraction module 1342 may determine whether at least one slot candidate output from the NLU model 1320 and slot history information extracted from the second speech recognition result history database 1360 are the same.

When the at least one text interpretation result candidate output from the NLU model 1320 and the text interpretation history information extracted from the second speech recognition result history database 1360 are not the same, the history information extraction module 1342 may provide the text interpretation result candidate and the extracted text interpretation history information to the weight learning module 1344.

The weight learning module 1344 is a module configured to train a weight used to determine the text interpretation result information corresponding to the text obtained from the first continuity learning model 1330 using the text interpretation history information extracted from the second speech recognition result history database 1360. In an embodiment of the disclosure, the weight learning module 1344 may include a DNN model including a plurality of neural network layers that receive the text and output the text interpretation result information. Each of the plurality of neural network layers has a plurality of weight values, and may perform a neural network operation using an operation result of a previous layer and an operation between the plurality of weight values. The weight learning module 1344 may include at least one of, for example, and without limitation, a convolutional neural network model (CNN), a recurrent neural network model (RNN), a Restricted Boltzmann Machine (RBM), a Deep Belief Network (DBN), a Bidirectional Recurrent Deep Neural Network (BRDNN), Deep Q-Networks, etc., but is not limited to the above-described examples. In an embodiment of the disclosure, the weight learning module 1344 may determine the text interpretation history information extracted by the history information extraction module 1342 as a ground truth with respect to the input text and perform training to add a high weight. The weight learning module 1344 may update the output of the NLU model 1320 by determining the text interpretation result information output from the NLU model 1320 using the extracted text interpretation history information.

The weight learning module 1344 provides the determined text interpretation result information to the outputter 1500. The outputter 1500 may include a display 1510 (see FIG. 4) and a speaker 1520 (see FIG. 4), and may output the text received from the weight learning module 1344 as a user interface or a sound signal.

The device 1000b according to an embodiment of the disclosure may store a result of interpreting a user's utterance in the past, for example, text interpretation history information about a domain, an intent, and a slot detected from a speech signal in second speech recognition result history database 1360, and when receiving a speech input of the user, provide speech recognition result information corresponding to the speech input through training to adjust a weight used to determine the text interpretation result information output from the NLU model 1320 using the text interpretation history information previously stored in the second speech recognition result history database 1360. Accordingly, the device 1000a shown in FIG. 1 recognizes the user's pronunciation, intonation, dialect, and gender-based voice and provides only the text with respect to the recognized speech signal, whereas the device 1000b of the disclosure may provide a user experience that maintains continuity with a speech recognition result of the past time even with respect to the text interpretation result information.

Figure 3:
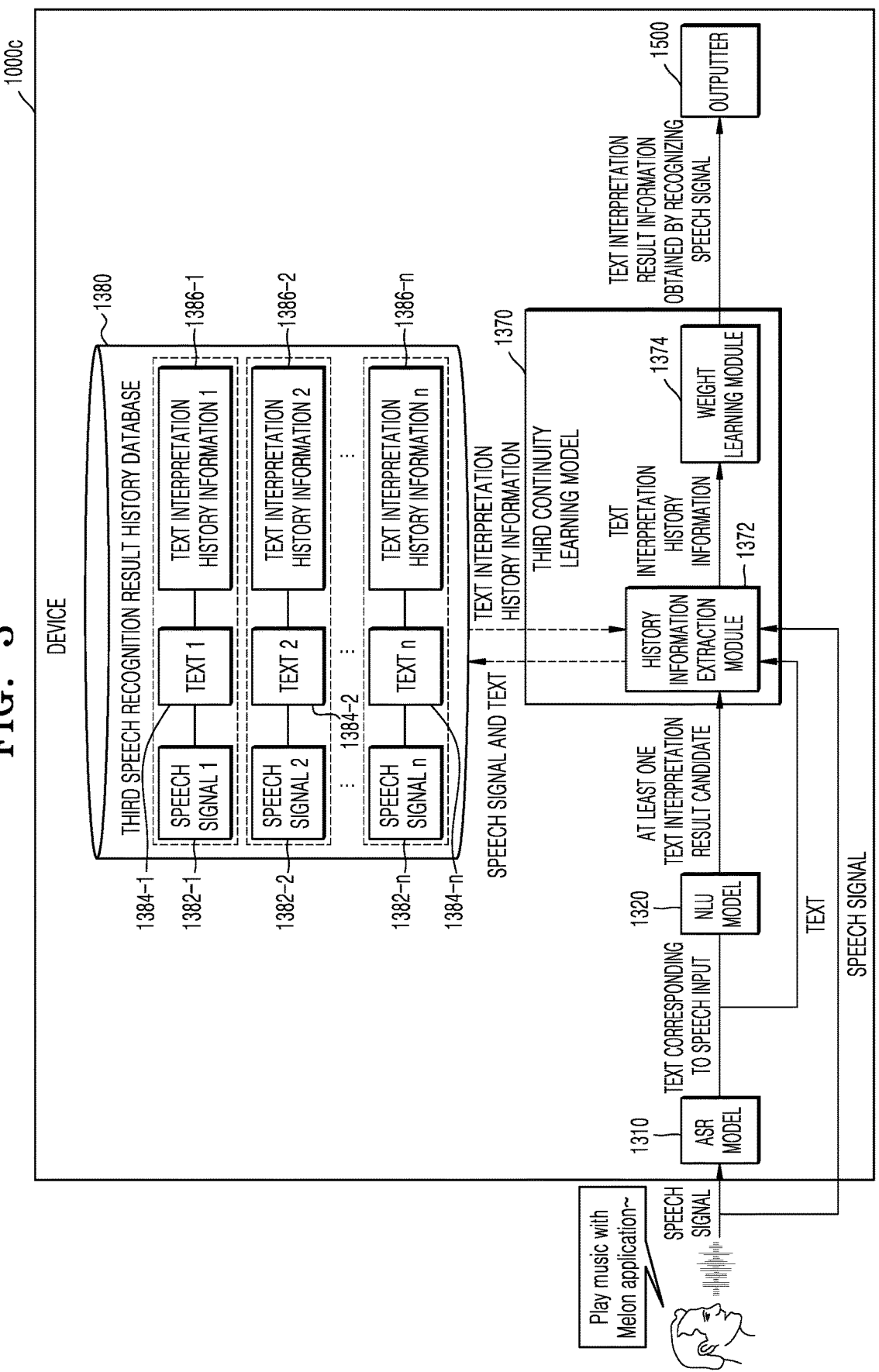
FIG. 3 is a diagram illustrating an example operation in which a device recognizes a speech input of a user and outputs a speech recognition result according to various embodiments.

FIG. 3 is a diagram illustrating an example operation in which a device 1000c recognizes a speech input of a user and outputs a speech recognition result according to various embodiments.

Referring to FIG. 3, the device 1000c may include the ASR model 1310, the NLU model 1320, a third continuity learning model (e.g., including various processing circuitry and/or executable program instructions) 1370, a third speech recognition result history database 1380, and the outputter (e.g., including output circuitry) 1500. Components for describing the operation of the device 1000c are illustrated in FIG. 3. The configuration included in the device 1000c is not limited to that shown in FIG. 3.

The ASR model 1310 and the NLU model 1320 illustrated in FIG. 3 are the same as the ASR model 1310 and the NLU model 1320 illustrated in FIG. 2, respectively, and thus the redundant descriptions may not be repeated here.

In the device 1000c shown in FIG. 3, unlike the device 1000b shown in FIG. 2, the NLU model 1320 receives a text output from the ASR model 1310, and interprets the received text to output at least one text interpretation result information. That is, in the embodiment shown in FIG. 3, the ASR model 1310 and the NLU model 1320 may be connected in a cascade structure.

The NLU model 1320 provides at least one piece of text interpretation result information to the continuity learning model 1370.

The third continuity learning model 1370 is a model trained to determine text interpretation result information corresponding to the speech input received from the user by comparing the speech input, a text converted by the ASR model 1310, and at least one text interpretation result information output by the NLU model 1320 by interpreting the text with speech recognition result history information previously stored in the third speech recognition result history database 1380. The third continuity learning model 1370 may include a history information extraction module 1372 and a weight learning module 1374.

The history information extraction module 1372 is a module configured to compare the speech input received from the user and the text output from the ASR model 1310 and corresponding to the speech input with a plurality of speech signals 1382-1 to 1382-n and a plurality of texts 1384-1 to 1384-n, respectively, previously stored in the third speech recognition result history database 1380 and, based on comparison results, extract previously interpreted text interpretation history information in correspondence to the speech input and the text.

The third speech recognition result history database 1380 is a database that stores a speech signal previously obtained before a time when the speech input is received from the user, the text obtained by converting the speech signal, and the text interpretation history information obtained by interpreting the text. In an embodiment of the disclosure, the third speech recognition result history database 1380 may store the plurality of speech signals 1382-1 to 1382-n received at a past time, the plurality of texts 1384-1 to 1384-n obtained by converting the plurality of speech signals 1382-1 to 1382-n by the ASR model 1310, and a plurality of text interpretation history information 1386-1 to 1386-n obtained by respectively interpreting the plurality of texts 1384-1 to 1384-n using the NLU model 1320. In an embodiment of the disclosure, the plurality of speech signals 1382-1 to 1382-n, the plurality of texts 1384-1 to 1384-n, and the plurality of text interpretation history information 1386-1 to 1386-n may be grouped according to related data and stored in the third speech recognition result history database 1380. For example, the first speech signal 1382-1, the first text 1384-1, and the first text interpretation history information 1386-1 may form a first group and be stored, and the second speech signal 1382-2, the second text 1384-2, and the second text interpretation history information 1386-2 may form a second group and be stored.

In an embodiment of the disclosure, the third speech recognition result history database 1380 may store data output during an intermediate process of respectively obtaining the plurality of text interpretation history information 1386-1 to 1386-n from the plurality of speech signals 1382-1 to 1382-n. For example, a feature vector, softmax, or a weighted vector output in a process of respectively converting the plurality of speech signals 1382-1 to 1382-n into the plurality of texts 1384-1 to 1384-n, or a feature vector, softmax, or a weighted vector output in a process of respectively obtaining the plurality of text interpretation history information 1386-1 to 1386-n from the plurality of texts 1384-1 to 1384-n may be stored in the third speech recognition result history database 1380.

The history information extraction module 1372 may measure similarity between the speech signal received from the user and the plurality of speech signals 1382-1 to 1382-n previously stored in the third speech recognition result history database 1380 to calculate the similarity between speech signals. The history information extraction module 1372 may measure similarity between the text output from the ASR model 1310 and the plurality of texts 1384-1 to 1384-n previously stored in the third speech recognition result history database 1380 to calculate the similarity between texts. In an embodiment of the disclosure, the history information extraction module 1372 may measure the similarity between speech signals and the similarity between texts using a cosine similarity measurement method. However, the disclosure is not limited thereto, and the history information extraction module 1372 may measure the similarity between speech signals and the similarity between texts using, for example, a Jaccard similarity, Euclidean similarity, or Manhattan similarity measurement method or algorithm.

The history information extraction module 1372 may identify a speech signal for which the measured similarity of the speech signal exceeds a first specified threshold and a text for which the similarity of the text exceeds a second threshold, and extract text history information grouped with the identified speech signal and text from the third speech recognition result history database 1380. For example, when a speech signal identified to have the similarity of the speech signal exceeding the first threshold is the second speech signal 1382-2 among the plurality of speech signals 1382-1 to 1382-n previously stored in the third speech recognition result history database 1380, and a text identified to have the similarity of the text exceeding the second threshold is the second text 1362-2 among the plurality of texts 1384-1 to 1384-n previously stored in the third speech recognition result history database 1380, the history information extraction module 1372 may extract the second text interpretation history information 1364-2 grouped with the second speech signal 1382-2 and the second text 1362-2.

The history information extraction module 1372 may compare at least one text interpretation result candidate output from the NLU model 1320 with text interpretation history information extracted from the third speech recognition result history database 1380 to determine whether the at least one text interpretation result candidate and the text interpretation history information are the same. When the at least one text interpretation result candidate output from the NLU model 1320 and the text interpretation history information extracted from the third speech recognition result history database 1380 are not the same, the history information extraction module 1372 may provide the at least one text interpretation result candidate and the extracted text interpretation history information to the weight learning module 1374.

The weight learning module 1374 is a module configured to train a weight used to determine text interpretation result information corresponding to the speech input received from the user using the text interpretation history information extracted from the third speech recognition result history database 1380. In an embodiment of the disclosure, the weight learning module 1374 may include a DNN model including a plurality of neural network layers. Each of the plurality of neural network layers has a plurality of weight values, and may perform a neural network operation using an operation result of a previous layer and an operation between the plurality of weight values. The weight learning module 1374 may include at least one of, for example, and without limitation, a convolutional neural network model (CNN), a recurrent neural network model (RNN), a Restricted Boltzmann Machine (RBM), a Deep Belief Network (DBN), a Bidirectional Recurrent Deep Neural Network (BRDNN), Deep Q-Networks, etc., but is not limited to the above-described examples.

In an embodiment of the disclosure, the weight learning module 1374 may determine the text interpretation history information extracted by the history information extraction module 1372 as a ground truth with respect to the speech input received from the user and perform training to add a high weight. The weight learning module 1374 may update the output of the ASR model 1310 and the NLU model 1320 by determining the text interpretation result information with respect to the speech input using the text interpretation history information extracted from the third speech recognition result history database 1380.

The device 1000*c* according to an embodiment of the disclosure may connect the ASR model 1310 and the NLU model 1320 in a cascade structure, and determine the text interpretation result information with respect to the speech input received from the user using a speech signal, a text and text interpretation history information obtained in the past through the one continuity learning model 1370. The device 1000*c* according to the embodiment shown in FIG. 3 includes only one continuity learning model 1370 unlike the device 1000*b* of FIG. 2 including separate continuity learning models (a first continuity learning model and a second continuity learning model) with respect to each of the ASR model 1310 and the NLU model 1320. Accordingly, the device 1000*c* according to the embodiment of FIG. 3 may significantly reduce errors that may occur when separately updating a speech recognition result value of each of the ASR model 1310 and the NLU model 1320. In addition, the device 1000*c* according to the embodiment of FIG. 3 only needs to learn a weight in one continuity learning model 1370, thereby reducing a processing time required for training.

Figure 4:
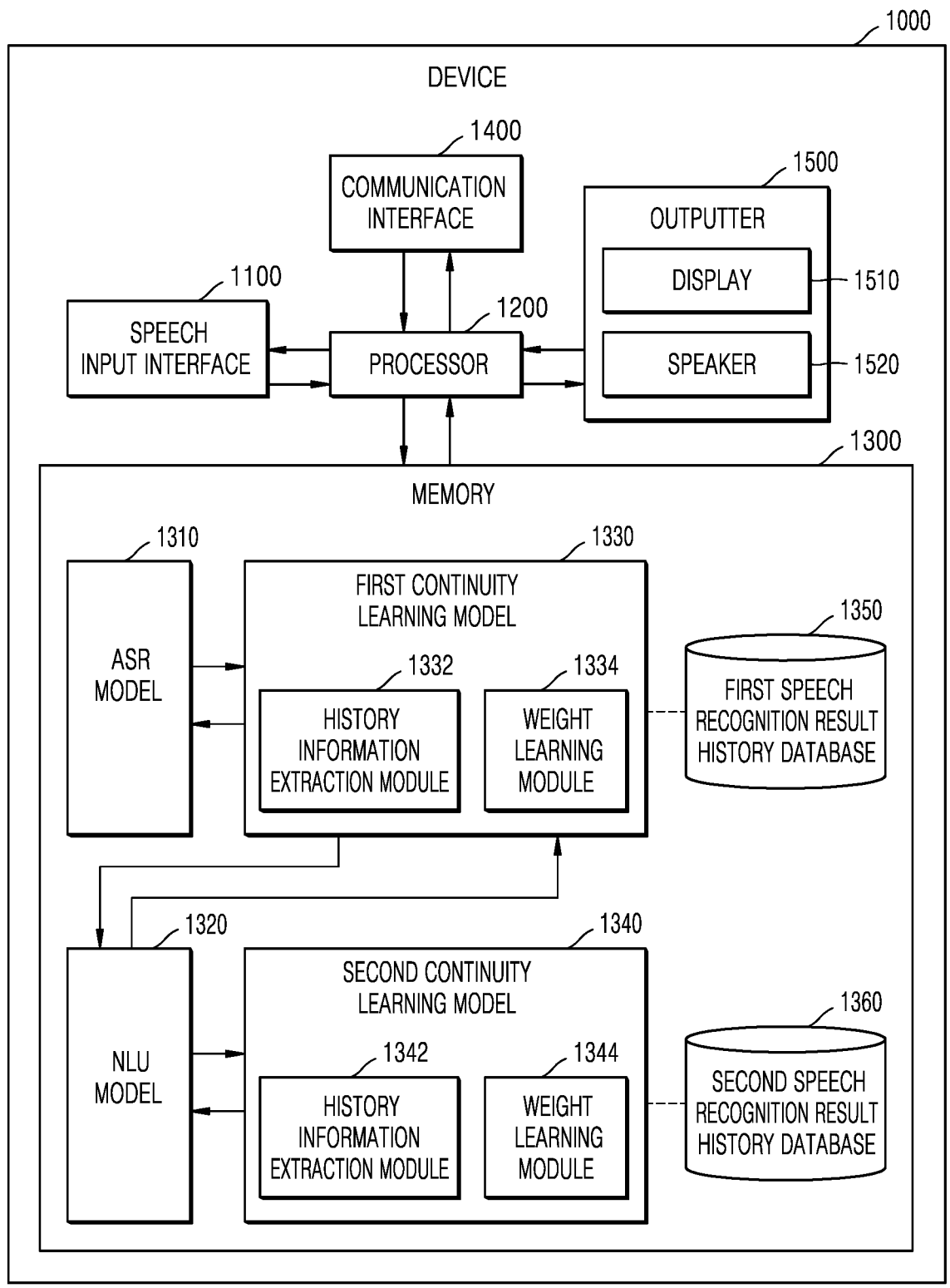
FIG. 4 is a block diagram illustrating an example configuration of a device according to various embodiments.

FIG. 4 is a block diagram illustrating an example configuration of the device 1000 according to various embodiments.

The device 1000 is an electronic device that receives a speech input of a user, processes the speech input, converts the speech input into text, and performs a function or an operation related to the converted text. The device 1000 may include at least one of, for example, and without limitation, a smart phone, a tablet personal computer (PC), a mobile phone, a video phone, an e-book reader, a desktop personal computer (PC), a laptop PC, a netbook computer, a workstation, a server, a personal digital assistant (PDA), a portable multimedia player (PMP), an MP3 player, a mobile medical device, a camera, a wearable device, or the like. However, the device 1000 is not limited to the above-described example.

The device 1000 may include a speech input interface (e.g., including input circuitry) 1100, a processor (e.g., including processing circuitry) 1200, a memory 1300, a communication interface (e.g., including communication circuitry) 1400, and the outputter (e.g., including output circuitry) 1500.

The speech input interface 1100 may include various circuitry and receive a speech input from a user. In an embodiment of the disclosure, the speech input interface 1100 may include a microphone. The speech input interface 1100 may receive the speech input (e.g., a user's utterance) from the user through the microphone, and obtain a speech signal from the received speech input. In an embodiment of the disclosure, the processor 1200 of the device 1000 may convert a sound received through the microphone into a sound signal, and remove noise (e.g., a non-voice component) from the sound signal to obtain the speech signal.

Although not shown in the drawing, the device 1000 may include a speech preprocessing module having a function of detecting a specified speech input (e.g., a wake-up input such as 'Hi Bixby', 'Ok Google', etc.) or a function of preprocessing a speech signal obtained from some speech inputs.

The processor 1200 may include various processing circuitry and execute one or more instructions of a program stored in the memory 1300. The processor 1200 may include hardware components that perform arithmetic, logic, and input/output operations and signal processing. The processor 1200 may include at least one of, for example, and without limitation, a dedicated processor, a central processing unit (CPU), a microprocessor, a graphic processing unit (GPU), application specific integrated circuits (ASICs), digital signal processors (DSPs), digital signal processing devices (DSPDs), programmable logic devices (PLDs), field programmable gate arrays (FPGAs), or the like, but is not limited thereto.

The memory 1300 may store the program including instructions for processing the speech input of the user received through the speech input interface 1100, converting the speech input into the text, interpreting the converted text to obtain text interpretation result information. The memory 1300 may store instructions and program codes readable by the processor 1200. In the following embodiment of the disclosure, the processor 1200 may be implemented by executing instructions or codes of the program stored in the memory 1300.

The memory 1300 may store data corresponding to each of the ASR model 1310, the NLU model 1320, the first continuity learning model 1330, the second continuity learning model 1340, the first speech recognition result history database 1350, and the second speech recognition result history database 1360.

The memory 1300 may include at least one type of storage medium, for example, a flash memory type, a hard disk type, a multimedia card micro type, a card type memory (e.g., SD or XD memory), random-access memory (RAM), static random-access memory (SRAM), read-only memory (ROM), electrically erasable programmable read-only memory (EEPROM), programmable read-only memory (PROM), a magnetic memory, a magnetic disk, or an optical disk.

The ASR model 1310 is a speech recognition model that recognizes a user's speech, and is a model trained to convert the speech input received from the user into text and output the converted text. In an embodiment of the disclosure, the ASR model 1310 may be an AI model including a sound model, a pronunciation dictionary, and a language model. However, the disclosure is not limited thereto, and the ASR model 1310 may be an end-to-end speech recognition model having a structure including an integrated deep neural network (DNN) without separately including the pronunciation dictionary and the language model. An end-to-end ASR method is a speech recognition method using a DNN trained to directly map a speech signal to a character string or word string. Unlike other speech recognition methods that use multiple models, such as the sound model and the language model, the end-to-end ASR method may simplify a speech recognition process using a single trained DNN. Sub-embodiments of the end-to-end ASR model 1310 include, for example, an RNN-T model and a connectionist temporal classification (CTC) model.

The processor 1200 may convert the speech signal received through the speech input interface 1100 into the text using instructions or a program code stored in the memory 1300 and related to the ASR model 1310. In an embodiment of the disclosure, the processor 1200 may obtain one or more text candidates including the plurality of character strings based on a confidence score indicating a probability value that the speech signal may be predicted as the plurality of frame-synchronized character strings. The 'confidence score of the character string' indicates a degree of how accurately the ASR model 1310 that outputs a certain character string recognizes the speech signal. For example, the confidence score of the character string may be calculated according to a specified mathematical equation based on a likelihood obtained from a certain character string, a partial likelihood output in a process of estimating the certain character string, or a posterior probability value. For example, the processor 1200 may calculate the confidence score based on a likelihood output as a result of Viterbi decoding. As another example, in the case of the end-to-end ASR model 1310, the processor 1200 may calculate the confidence score based on posterior probabilities output from a softmax layer. As another example, the processor 1200 may determine a plurality of estimation character strings estimated in a speech recognition process with respect to the speech signal, and calculate a confidence score with respect to the plurality of character strings based on degrees of correlation of the plurality of estimation character strings.

In an embodiment of the disclosure, the one or more text candidates that the processor 1200 obtains by recognizing the speech signal using the ASR model 1310 may be an N-Best candidate having a confidence score exceeding a specified threshold.

For example, when the speech input received from the user is an utterance "Play music with Melon application", the processor 1200 may obtain the N-Best candidate including a first text candidate including a character string "Play music with Mellong application", a second text candidate including a character string "Play music with Merong application", and a third text candidate including a character string "Play music with Melon application". N-Best candidates may have different confidence scores. For example, a confidence score of the first text candidate may be 3.45, a confidence score of the second text candidate may be 3.44, and a confidence score of the third text candidate may be 3.41. However, this is only an example for convenience of description, and is not limited thereto.

The first continuity learning model 1330 is a model trained to determine a text corresponding to the speech signal by comparing the speech signal received from the user and the one or more text candidates obtained by the processor 1200, that is, the N-Best candidate, with speech recognition result history information previously stored in the first speech recognition result history database 1350. The first continuity learning model 1330 may include the history information extraction module 1332 and the weight learning module 1334.

The processor 1200 may compare the speech signal received through the speech input interface 1100 with a speech signal previously stored in the first speech recognition result history database 1350 and, based on results of comparison, extract previously converted text history information in correspondence to the speech signal, using instructions or a program code related to the history information extraction module 1332.

The first speech recognition result history database 1350 is a database that stores the speech signal previously obtained before a time when the speech input is received from the user and the history information of the text obtained by converting the speech signal. The first speech recognition result history database 1350 is the same as the speech recognition result history database 1350 shown in FIG. 1, and thus a redundant description thereof will be omitted.

The first speech recognition result history database 1350 may include a non-volatile memory. The non-volatile memory may refer to a storage medium that stores and maintains information even when power is not supplied and may use the stored information again when power is supplied. The non-volatile memory may include at least one of, for example, a flash memory, a hard disk, a solid state drive (SSD), a multimedia card micro type memory, a card type memory (e.g., SD or XD memory, etc.), a read only memory (ROM), a magnetic memory, a magnetic disk, or an optical disk.

In FIG. 4, the first speech recognition result history database 1350 is included in the memory 1300 of the device 1000, but is not limited thereto. In an embodiment of the disclosure, the first speech recognition result history database 1350 may be included in the device 1000 as a separate component other than the memory 1300, or may be connected through wired/wireless communication through the communication interface 1400 as a component not included in the device 1000.

In an embodiment of the disclosure, the processor 1200 may measure (determine, calculate, etc.) similarity between the speech signal input through the speech input interface 1100 and a plurality of speech signals previously stored in the first speech recognition result history database 1350, using the instructions or the program code related to the history information extraction module 1332. In an embodiment of the disclosure, the processor 1200 may measure the similarity between the speech signal received through the speech input interface 1100 and the plurality of speech signals previously stored in the first speech recognition result history database 1350, using a cosine similarity measuring method. However, the disclosure is not limited thereto, and the processor 1200 may measure similarity between the speech signal received from the user and the plurality of speech signals previously stored in the first speech recognition result history database 1350, using a well-known similarity measuring algorithm or method.

In an embodiment of the disclosure, the processor 1200 may identify a speech signal for which the measured similarity exceeds a preset or specified threshold among the speech signal obtained through the speech input interface 1100 and the plurality of speech signals previously stored in the first speech recognition result history database 1350 and extract the text history information corresponding to the identified speech signal, using the instructions or the program code related to the history information extraction module 1332. For example, the processor 1200 may obtain a speech signal of "Play music with Melon application" from the user's utterance received through the speech input interface 1100, measure similarity between the obtained speech signal and the plurality of speech signals previously stored in the first speech recognition result history database 1350, and identify a speech signal for which the measured similarity exceeds the specified threshold. The processor 1200 may extract text history information paired with the identified speech signal from among a plurality of text history information previously stored in the first speech recognition result history database 1350. The extracted text history information may include, for example, the character string "Play music with Melon application".

The processor 1200 may compare the one or more text candidates obtained from the ASR model 1310 with the text history information extracted from the first speech recognition result history database 1350 to determine whether the one or more text candidates and the text history information are the same. When the one or more text candidates output from the ASR model 1310 and the text history information extracted from the first speech recognition result history database 1350 are not the same, the processor 1200 may provide the one or more text candidates and the extracted text history information to the weight learning module 1334.

The weight learning module 1334 is a module configured to train a weight that determines the text corresponding to the speech input received from the user using the text history information extracted from the first speech recognition result history database 1350. In an embodiment of the disclosure, the weight learning module 1334 may include a DNN model that receives a speech signal, outputs a text, and includes a plurality of neural network layers. Each of the plurality of neural network layers has a plurality of weight values, and may perform a neural network operation using an operation result of a previous layer and an operation between the plurality of weight values. The weight learning module 1334 may include at least one of, for example, and without limitation, a convolutional neural network model (CNN), a recurrent neural network model (RNN), a Restricted Boltzmann Machine (RBM), a Deep Belief Network (DBN), a Bidirectional Recurrent Deep Neural Network (BRDNN), Deep Q-Networks, etc., but is not limited to the above-described examples. In an embodiment of the disclosure, the weight learning module 1334 may determine the text history information extracted by the history information extraction module 1332 as a ground truth with respect to the speech input received from the user and perform training to add a high weight.

In an embodiment of the disclosure, the processor 1200 may update the output of the ASR model 1310 by determining the output text of the ASR model 1310 using the text history information extracted from the first speech recognition result history database 1350 using instructions or a program code related to the weight learning module 1334. For example, the processor 1200 may determine the third text candidate that is the same as the extracted text history information among the one or more text candidates obtained from the ASR model 1310 as the text corresponding to the speech input through training to add a high weight to the extracted text history information using the history information extraction module 1332. The third text candidate has the confidence score of 3.41, which is lower than the confidence scores of the first text candidate and the second text candidate, but may be determined as the text corresponding to the speech input according to results of training by the weight learning module 1334.

The first continuity learning model 1330 provides information about the determined text to the NLU model 1320.

The NLU model 1320 is a model trained to obtain text interpretation result information by interpreting the text received from the first continuity learning model 1330. The text interpretation result information may include information about a domain, an intent, and a slot detected by interpreting the text. The text input to the NLU model 1320 may be a text corresponding to the speech input received from the user through the speech input interface 1100.

The processor 1200 may obtain at least one text interpretation result candidate by interpreting the text using instructions or a program code related to the NLU model 1320. In an embodiment of the disclosure, the at least one text interpretation result candidate may include at least one domain candidate, at least one intent candidate, and at least one slot candidate predicted from the text by interpreting the text using the NLU model 1320. For example, the processor 1200 may obtain the at least one domain candidate based on a probability value that a category or a region related to a user's intention identified by interpreting the text is predicted as a specific domain. As another example, the processor 1200 may obtain the at least one intent candidate based on a probability value that information indicating a user's utterance intention is predicted as a specific intent by interpreting the text. Also, the processor 1200 may obtain the at least one slot candidate based on a probability value that a detected named entity is predicted as a specific slot by interpreting the text. When a plurality of slots are detected from the text, the processor 1200 may obtain the at least one slot candidate with respect to each of the plurality of slots. Here, the 'probability value' may refer, for example, to a confidence score. In an embodiment of the disclosure, the at least one text interpretation result candidate that the processor 1200 obtains by interpreting the text using the NLU model 1320 may be an N-Best candidate having a confidence score exceeding a specified threshold.

For example, the at least one domain candidate that the processor 1200 obtains by interpreting the text "Play music with Melon application" using the NLU model 1320 may be 'music', the at least one intent candidate may be 'music play' or 'content streaming', and the at least one slot candidate may be 'melon application', 'fruit melon', or 'application'. The at least one domain candidate, the at least one intent candidate, and the at least one slot candidate may have different confidence scores.

The processor 1200 may provide the text obtained from the first continuity learning model 1330 and the at least one text interpretation result candidate obtained using the NLU model 1320 to the second continuity learning model 1340. In an embodiment of the disclosure, the processor 1200 may provide the text obtained from the first continuity learning model 1330 and the at least one text interpretation result candidate obtained using the NLU model 1320 to the outputter 1500.

The second continuity learning model 1340 is a model trained to determine the text interpretation result information corresponding to the text by comparing the text and the at least one text interpretation result candidate received from NLU model 1320 with speech recognition result history information previously stored in the second speech recognition result history database 1360. The second continuity learning model 1340 may include the history information extraction module 1342 and the weight learning module 1344.

The history information extraction module 1342 is a module configured to compare the text received from the first continuity learning model 1330 with a plurality of texts previously stored in the second speech recognition result history database 1360 and extract the previously obtained text interpretation history information in correspondence to the text based on a comparison result.

The second speech recognition result history database 1360 is a database that stores the previously obtained text output from the ASR model 1310 before a time when the speech input is received from the user and the text interpretation history information detected by interpreting the previously obtained text. The second speech recognition result history database 1360 is the same as the second speech recognition result history database 1360 shown in FIG. 2, and thus a redundant description thereof will be omitted.

Like the first speech recognition result history database 1350, the second speech recognition result history database 1360 may also include a non-volatile memory. The description of the non-volatile memory is the same as the description of the first speech recognition result history database 1350, and thus a redundant description of the non-volatile memory will be omitted. In the embodiment shown in FIG. 4, the second speech recognition result history database 1360 is included in the memory 1300 of the device 1000, but is not limited thereto. In an embodiment of the disclosure, the second speech recognition result history database 1360 may be included in the device 1000 as a separate component other than the memory 1300, or may be connected through wired/wireless communication through the communication interface 1400 as a component not included in the device 1000.

In an embodiment of the disclosure, the processor 1200 may measure similarity between the text received from the first continuity learning model 1330 and a plurality of texts previously stored in the second speech recognition result history database 1360, using instructions or a program code related to the history information extraction module 1342. In an embodiment of the disclosure, the processor 1200 may measure the similarity between the text received from the first continuity learning model 1330 and the plurality of texts previously stored in the second speech recognition result history database 1360 using, for example, a cosine similarity measurement method. However, the disclosure is not limited thereto, and the processor 1200 may measure the similarity between the text received from the first continuity learning model 1330 and the plurality of texts previously stored in the second speech recognition result history database 1360 using, for example, a Jaccard similarity, Euclidean similarity, or Manhattan similarity measurement method or algorithm.

In an embodiment of the disclosure, the processor 1200 may identify a text for which the measured similarity exceeds a specified threshold among the plurality of texts previously stored in the second speech recognition result history database 1360 and extract text interpretation history information corresponding to the identified text using the instructions or the program code related to the weight learning module 1334. In an embodiment of the disclosure, the processor 1200 may extract text interpretation history information paired with the identified text from the second speech recognition result history database 1360. For example, when the identified text is "Play music with Melon application", the processor 1200 may extract information of a domain 'music', an intent 'music play', and a slot 'melon application' as the text interpretation history information paired with the text from the second speech recognition result history database 1360.

In an embodiment of the disclosure, the processor 1200 may compare the at least one text interpretation result candidate obtained using the NLU model 1320 with the text interpretation history information extracted from the second speech recognition result history database 1360 to determine whether at least one text interpretation result candidate and the text interpretation history information are the same. In an embodiment of the disclosure, the processor 1200 may sequentially determine the sameness according to the type of text interpretation result information. For example, the processor 1200 may determine whether the at least one text interpretation result candidate and the text interpretation history information are the same in the order of a domain, an intent, and a slot. For example, the processor 1200 may determine whether at least one domain candidate 'music' obtained using the NLU model 1320 and domain history information 'music' extracted from the second speech recognition result history database 1360 are the same, and when it is determined that the at least one domain candidate 'music' and the domain history information 'music' are the same, determine whether at least one intent candidate 'music play' and 'content streaming' and intent history information 'music play' extracted from the second speech recognition result history database 1360 are the same. After determining whether intents are the same, the processor 1200 may determine whether at least one slot candidate 'melon application', 'fruit melon' or 'application' output from the NLU model 1320 and slot history information 'melon application' extracted from the second speech recognition result history database 1360 are the same.

When the at least one text interpretation result candidate output from the NLU model 1320 and the text interpretation history information extracted from the second speech recognition result history database 1360 are not the same, the processor 1200 may provide the text interpretation result candidate and the extracted text interpretation history information to the weight learning module 1344.

The weight learning module 1344 is a module configured to train a weight used to determine the text interpretation result information corresponding to the text obtained from the first continuity learning model 1330 using the text interpretation history information extracted from the second speech recognition result history database 1360. In an embodiment of the disclosure, the weight learning module 1344 may include a DNN model including a plurality of neural network layers that receive the text and output the text interpretation result information. Each of the plurality of neural network layers has a plurality of weight values, and may perform a neural network operation using an operation result of a previous layer and an operation between the plurality of weight values. The weight learning module 1344 may include at least one of, for example, and without limitation, a convolutional neural network model (CNN), a recurrent neural network model (RNN), a Restricted Boltzmann Machine (RBM), a Deep Belief Network (DBN), a Bidirectional Recurrent Deep Neural Network (BRDNN), Deep Q-Networks, etc., but is not limited to the above-described examples.

In an embodiment of the disclosure, the processor 1200 may determine the text interpretation history information extracted by the history information extraction module 1342 as a ground truth with respect to the text and perform training to add a high weight, using instructions or a program code related to the weight learning module 1344. The processor 1200 may update the output of the NLU model 1320 by determining the text interpretation result information output from the NLU model 1320 using the extracted text interpretation history information. For example, the processor 1200 may determine the ground truth with respect to the text "Play music with Melon application" as the domain 'music', the intent 'music play', and the slot 'melon application', and update output information of the NLU model 1320, that is, text interpretation result information, based on a usage history through training to add a high weight to the determined ground truth.

The processor 1200 may provide the determined text interpretation result information to the outputter 1500.

The communication interface 1400 may include various communication circuitry and perform data communication with a server or other device. The communication interface 1400 may perform data communication with the server or other device using at least one of data communication methods including, for example, wired LAN, wireless LAN, Wi-Fi, Bluetooth, Zigbee, Wi-Fi Direct (WFD), Infrared Data Association (IrDA), Bluetooth Low Energy (BLE), Near Field Communication (NFC), Wireless Broadband Internet (Wibro), World Interoperability for Microwave Access (WiMAX), Shared Wireless Access Protocol (SWAP), Wireless Gigabit Alliance (WiGig) or RF communication.

The communication interface 1400 may download data for updating a speech recognition model of at least one of the ASR model 1310 or the NLU model 1320 from the server under the control of the processor 1200. In an embodiment of the disclosure, the communication interface 1400 may transmit update information of the ASR model 1310 to the server through the first continuity learning model 1330 under the control of the processor 1200. In an embodiment of the disclosure, the communication interface 1400 may transmit update information of the NLU model 1320 to the server through the second continuity learning model 1340 under the control of the processor 1200.

The outputter 1500 may include various output circuitry and output the text or the text interpretation result information corresponding to the speech input. The outputter 1500 may notify the user of a result of speech recognition, e.g., the text, or transmit the text to an external device (e.g., a smart phone, a home gadget, a wearable device, a server, etc.) The outputter 1500 may include a display 1510 and a speaker 1520.

The display 1510 may display the text converted from the speech input. In an embodiment of the disclosure, the display 1510 may display a user interface related to the text interpretation result information received from the processor 1200. The display 1510 may include at least one of, for example, and without limitation, a liquid crystal display, a thin film transistor-liquid crystal display, an organic light-emitting diode, a flexible display, a three-dimensional (3D) display, an electrophoretic display, or the like.

The speaker 1520 may output an audio signal corresponding to the text converted from the speech input. In an embodiment of the disclosure, the speaker 1520 may output an audio signal related to an operation or a function performed in response to the text interpretation result information.

Figure 5:
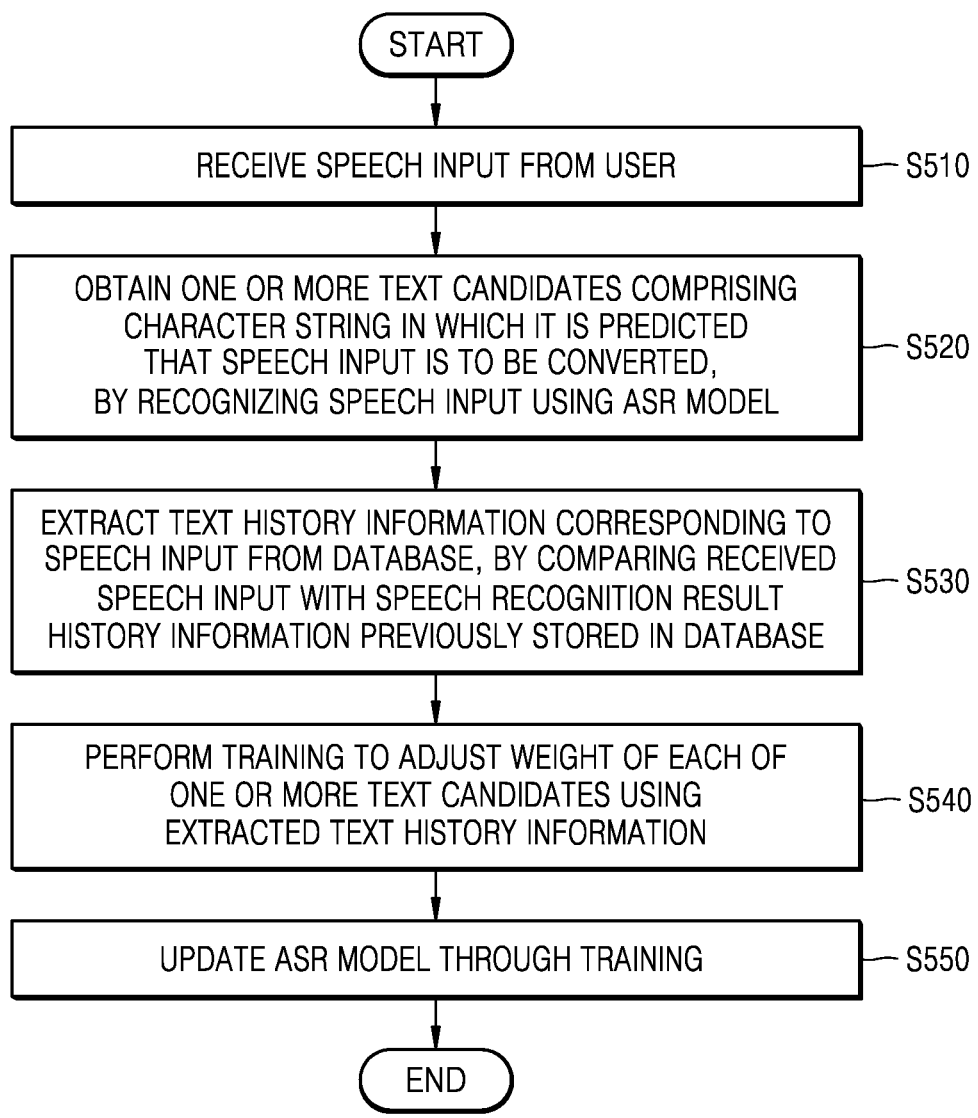
FIG. 5 is a flowchart illustrating an example method of operating a device according various embodiments.

FIG. 5 is a flowchart illustrating an example method of operating the device 1000 according to various embodiments.

In operation S510, the device 1000 receives a speech input from a user. In an embodiment of the disclosure, the device 1000 may receive the speech input (e.g., a user's utterance) from the user using the speech input interface 1100 (see FIG. 4) such as a microphone, and obtain a speech signal from the received speech input. The speech signal may be in the form of a wave file, but is not limited thereto. In an embodiment of the disclosure, the device 1000 may convert the wave file into a binary data file by encoding the wave file in binary format.

In operation S520, the device 1000 obtains one or more text candidates including a character string in which it is predicted that the speech input is to be converted, by recognizing the speech input using an ASR model. In an embodiment of the disclosure, the device 1000 may convert the speech signal into the text including a plurality of character strings synchronized in units of frames using the ASR model. Here, the 'frame' may refer, for example, to a unit in which a speech signal is divided at a regular time interval for processing of the speech signal, or the divided speech signal itself. The 'frame-synchronized character string' may refer, for example, to a character string including characters individually corresponding to frames of the speech signal when the speech signal is converted and output into the character string by the ASR model.

The device 1000 may output one or more text candidates including the plurality of character strings based on a confidence score indicating a probability value that the speech signal may be predicted as the plurality of frame-synchronized character strings. The 'confidence score of the character string' indicates a degree of how accurately the ASR model that outputs a certain character string recognizes the speech signal. For example, the confidence score of the character string may be calculated according to a specified mathematical equation based on a likelihood obtained from a certain character string, a partial likelihood output in a process of estimating the certain character string, or a posterior probability value. In an embodiment of the disclosure, the one or more text candidates output by recognizing the speech signal using the ASR model may be an N-Best candidate having a confidence score exceeding a specified threshold.

In operation S530, the device 1000 extracts text history information corresponding to the speech input from a database by comparing the received speech input with speech recognition result history information previously stored in the database. In an embodiment of the disclosure, the device 1000 may include the speech recognition result history database 1350 (see FIG. 4). The speech recognition result history database 1350 may store a previously obtained speech signal before a time when the speech input is received from the user, e.g., before operation S510 is performed, and history information of a text obtained by converting the speech signal. In an embodiment of the disclosure, the speech recognition result history database 1350 may store a plurality of speech signals received at a past time and a plurality of text history information output by respectively converting the plurality of speech signals through training using the ASR model. In an embodiment of the disclosure, the plurality of speech signals may be paired with the plurality of corresponding text history information and stored in the speech recognition result history database 1350.

The device 1000 may measure similarity between the speech signal received in operation S510 and the plurality of speech signals previously stored in the speech recognition result history database 1350. In an embodiment of the disclosure, the device 1000 may measure the similarity between the speech signal received from the user and the plurality of speech signals previously stored in the speech recognition result history database 1350 using a cosine similarity measurement method. However, the disclosure is not limited thereto, and the device 1000 may measure the similarity between the speech signal received from the user and the plurality of speech signals previously stored in the speech recognition result history database 1350 using a known similarity measurement algorithm or method.

The device 1000 may identify a speech signal for which the measured similarity exceeds a specified threshold among the plurality of speech signals. The device 1000 may extract text history information paired with the identified speech signal from among the plurality of text history information stored in the speech recognition result history database 1350.

In operation S540, the device 1000 performs training to adjust a weight of each of one or more text candidates using the extracted text history information. In an embodiment of the disclosure, the device 1000 may perform training using a DNN model including a plurality of neural network layers. The device 1000 may perform training using the DNN model including at least one of, for example, and without limitation, a convolutional neural network model (CNN), a recurrent neural network model (RNN), a Restricted Boltzmann Machine (RBM), a Deep Belief Network (DBN), a Bidirectional Recurrent Deep Neural Network (BRDNN), Deep Q-Networks, or the like.

In the DNN model, each of the plurality of neural network layers has a plurality of weight values, and may perform a neural network operation using an operation result of a previous layer and an operation between the plurality of weight values. In an embodiment of the disclosure, the device 1000 may determine the text history information extracted in operation S530 as a ground truth with respect to the speech input received from the user and perform training to add a high weight.

In operation S550, the device 1000 updates the ASR model using a result of the training. In an embodiment of the disclosure, the device 1000 may perform training to add the high weight to the extracted text history information, and update the ASR model to determine the text history information extracted as a result of training as the text with respect to the speech input received from the user.

Figure 6:
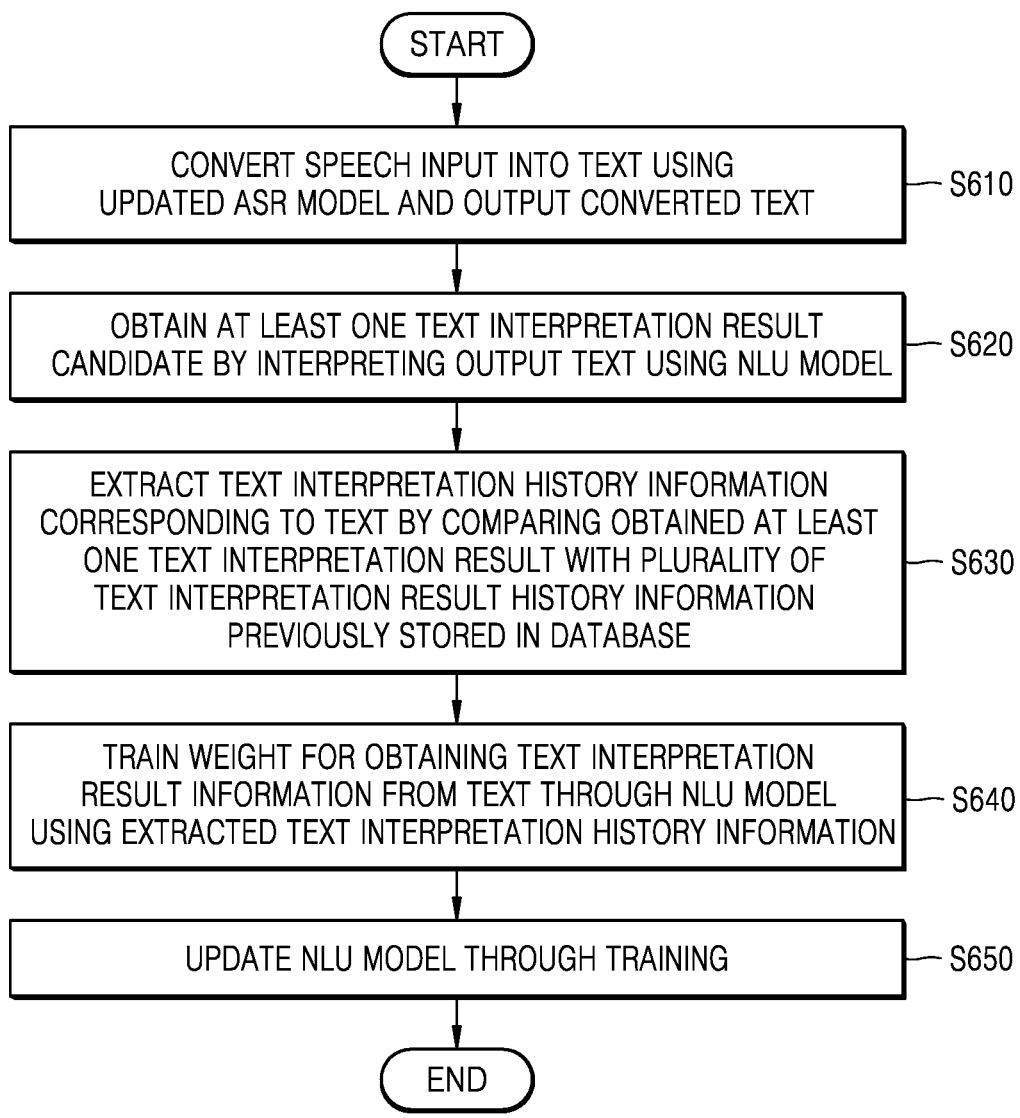
FIG. 6 is a flowchart illustrating an example method of operating a device according to various embodiments.

FIG. 6 is a flowchart illustrating an example method of operating the device 1000 according to various embodiments. In an embodiment of the disclosure, operation S610 shown in FIG. 6 may be performed after operation S550 of FIG. 5 is performed. However, the disclosure is not limited thereto, and operation S610 may be performed independently from operations performed in FIG. 5.

In operation S610, the device 1000 converts a speech input into a text using an updated ASR model and outputs the converted text.

In operation S620, the device 1000 obtains at least one text interpretation result candidate by interpreting the output text using an NLU model. The 'text interpretation result information' may include information about a domain, an intent, and a slot detected by interpreting the text using the NLU model.

In an embodiment of the disclosure, the device 1000 may obtain at least one domain candidate, at least one intent candidate, and at least one slot candidate predicted from the text by interpreting the text using the NLU model. For example, the device 1000 may obtain the at least one domain candidate based on a probability value that a category or a region related to a user's intention identified by interpreting the text is predicted as a specific domain. As another example, the device 1000 may obtain the at least one intent candidate based on a probability value that information indicating a user's utterance intention is predicted as a specific intent by interpreting the text. Also, the device 1000 may obtain the at least one slot candidate based on a probability value that a detected named entity is predicted as a specific slot by interpreting the text. When a plurality of slots are detected from the text, the device 1000 may output the at least one slot candidate with respect to each of the plurality of slots. Here, the 'probability value' may refer, for example, to a confidence score.

In an embodiment of the disclosure, the at least one text interpretation result candidate that the device 1000 obtains by interpreting the text using the NLU model may be an N-Best candidate having a confidence score exceeding a preset or specified threshold.

In operation S630, the device 1000 extracts text interpretation history information corresponding to the text by comparing the obtained at least one text interpretation result with a plurality of text interpretation result history information previously stored in a database. In an embodiment of the disclosure, the device 1000 may include the speech recognition result history database 1360 (see FIG. 4). The speech recognition result history database 1360 may store a previously obtained text before a time when the speech input is received from the user, e.g., at a past time, and text interpretation history information detected by interpreting the previously obtained text. The 'text interpretation history information' may include history information about a domain, an intent, and a slot detected by interpreting the text. In an embodiment of the disclosure, the speech recognition result history database 1360 may store a plurality of texts obtained at a past time and a plurality of text interpretation history information detected by interpreting the plurality of texts using the NLU model. In an embodiment of the disclosure, the plurality of texts may be paired with the related plurality of text interpretation history information and stored in the speech recognition result history database 1360.

The device 1000 may calculate similarity between the text output in operation S610 and the plurality of texts previously stored in the speech recognition result history database 1360. In an embodiment of the disclosure, the device 1000 may measure the similarity between the text output in operation S610 and the plurality of texts previously stored in the speech recognition result history database 1360 using a cosine similarity measurement method. However, the disclosure is not limited thereto, and the device 1000 may measure the output text and the plurality of texts previously stored in the second speech recognition result history database 1360 using a Jaccard similarity, Euclidean similarity, or Manhattan similarity measurement method or algorithm.

The device 1000 may identify a text for which the measured similarity exceeds a specified threshold among the plurality of texts previously stored in the speech recognition result history database 1360. The device 1000 may extract text interpretation history information forming a pair with the identified text from the speech recognition result history database 1360.

In operation S640, the device 1000 trains a weight for obtaining text interpretation result information from the text through the NLU model using the extracted text interpretation history information. In an embodiment of the disclosure, the device 1000 may train the weight for determining the text interpretation result information corresponding to the text output in operation S610 using the DNN model. In an embodiment of the disclosure, the DNN model may include a plurality of neural network layers that receive the text and output the text interpretation result information. Each of the plurality of neural network layers has a plurality of weight values, and may perform a neural network operation using an operation result of a previous layer and an operation between the plurality of weight values. The DNN model may include at least one of, for example, and without limitation, a convolutional neural network model (CNN), a recurrent neural network model (RNN), a Restricted Boltzmann Machine (RBM), a Deep Belief Network (DBN), a Bidirectional Recurrent Deep Neural Network (BRDNN), Deep ( ) Networks, etc., but is not limited to the above-described examples.

In an embodiment of the disclosure, the device 1000 may determine the text interpretation history information extracted from the speech recognition result history database 1360 as a ground truth with respect to the input text and perform training to add a high weight, using the DNN model.

In operation S650, the device 1000 updates the NLU model through training. In an embodiment of the disclosure, the device 1000 may update an output of the NLU model by determining the text interpretation result information output through the NLU model, using the text interpretation history information extracted from the speech recognition result history database 1360.

FIG. 7 is a signal flow diagram illustrating an example method of operating the device 1000 and a server 2000 according to various embodiments.

Referring to FIG. 7, the device 1000 may include a speech recognition model 1300a and a continuity learning model 1300b. The speech recognition model 1300a may include the ASR model 1310 and the NLU model 1320. The ASR model 1310 and the NLU model 1320 are respectively the same as the ASR model 1310 and the NLU model 1320 illustrated in FIG. 4, and thus redundant descriptions thereof are omitted. The continuity learning model 1300b may include the first continuity learning model 1330 and the second continuity learning model 1340. The first continuity learning model 1330 and the second continuity learning model 1340 are respectively the same as the first continuity learning model 1330 and the second continuity learning model 1340 shown in FIG. 4, and thus redundant descriptions may not be repeated.

The server 2000 may transmit/receive data to and from the device 1000 using a wired or wireless communication method. The server 2000 may include a speech recognition model 2300a. The speech recognition model 2300a may include an ASR model 2310 and a NLU model 2320. The ASR model 2310 is a model trained to convert a speech signal into a text, and the NLU model 2320 is a model trained to obtain information about a domain, an intent, and a slot related to the text.

Unlike the speech recognition model 1300a included in the device 1000, the speech recognition model 2300a included in the server 2000 may be updated to the latest version. The latest version of the ASR model 2310 may be a version including, for example, information about the latest named entity to convert the latest entity name input by a user into a text. The latest version of the NLU model 2320 may be a version, for example, to detect domain information or intent information related to a new speech command that has not existed before, or detect a new entity name included in the new speech command as slot information.

In operation S710, the device 1000 transmits user account information and device identification information (e.g., device ID) to the server 2000. In an embodiment of the disclosure, the device 1000 may transmit at least one of version information or latest update information of the speech recognition model 1300a to the server 2000 in addition to the user account information and the device identification information. Also, the device 1000 may transmit information about an IP address or a MAC address of the device 1000 to the server 2000.

In operation S720, the server 2000 determines whether the speech recognition model 1300a of the device 1000 is updated based on the user account information and the device identification information. In an embodiment of the disclosure, the server 2000 may receive version information of the speech recognition model 1300a of the device 1000, and compare the received version information of the speech recognition model 1300a with version information of the speech recognition model 2300a of the server 2000 to determine whether it is necessary to update the speech recognition model 1300a of the device 1000.

In operation S730, the server 2000 transmits the latest version of update data regarding the speech recognition model 1300a to the device 1000. The server 2000 may identify a type, a model name, or a function of the device 1000 based on the device identification information, and transmit an update data file of the speech recognition model 1300a related to the identified device 1000 to the device 1000.

In operation S740, the device 1000 updates the speech recognition model 1300a to the latest version. In an embodiment of the disclosure, the device 1000 may update the ASR model 1310 and the NLU model 1320 included in the speech recognition model 1300a to the latest version using the update data received from the server 2000. For example, the device 1000 may update the previously stored ASR model 1310 in an overwrite method using the data regarding the latest version of the ASR model 1310 received from the server 2000. In operation S740, the speech recognition model 1300a of the device 1000 and the speech recognition model 2300a of the server 2000 may be synchronized.

The device 1000 may convert a speech input related to the latest entity name, a new command, or a new function added, modified, or deleted through the update of the speech recognition model 1300a into a text and interpret the text to detect information including a domain, an intent, and a slot.

In operation S750, the device 1000 trains a weight of a speech recognition result using the continuity learning model 1300b. When the speech recognition model 1300a of the device 1000 is updated, speech recognition with respect to the speech input of the user, that is, an operation of converting the speech input into a text, and detecting a domain, an intent, and a slot from the converted text may be different from before. In this case, even though the user utters using the same voice, intonation, accent, pronunciation, or dialect as it is, the updated speech recognition model 1300a does output a recognition result in the same way as before. The device 1000 may assign a relatively high weight to speech recognition history information previously stored in the speech recognition result history databases 1350 and 1360 (see FIG. 4) included in the continuity learning model 1300b to perform training to update the output of the speech recognition model 1300a. Operation S750 is the same as the operation method illustrated and described in FIGS. 5 and 6, and thus a redundant description thereof is omitted.

In operation S760, the device 1000 updates the speech recognition model 1300a based on a training result.

In the embodiment shown in FIG. 7, the device 1000 may output the same speech recognition result with respect to a user's utterance, e.g., the speech input, using the continuity learning model 1300b even when the speech recognition model 1300a is updated to the latest version by the server 2000, thereby providing a user experience that maintains continuity. In particular, even when the speech recognition model 1300a is updated, the device 1000 may recognize the user's existing pronunciation, intonation, intonation, accent, or dialect, thereby improving the accuracy of speech recognition according to a user's intention.

FIG. 8 is a signal flow diagram illustrating an example method of operating the device 1000 and the server 2000 according to various embodiments.

Referring to FIG. 8, the device 1000 may include the speech recognition model 1300a and the continuity learning model 1300b. The device 1000 illustrated in FIG. 8 is the same as the device 1000 illustrated in FIG. 7, and thus redundant descriptions of components may not be repeated.

The server 2000 may include the speech recognition model 2300a and a continuity learning model 2300b. The speech recognition model 2300a may include the ASR model 2310 and the NLU model 2320. The speech recognition model 2300a is the same as or similar to the speech recognition model 2300a (see FIG. 7) shown in FIG. 7, and thus a redundant description may not be repeated.

Unlike the server 2000 illustrated in FIG. 7, the server 2000 in the embodiment of FIG. 8 may include the continuity learning model 2300b. The continuity learning model 2300b may include a first continuity learning model 2330 and a second continuity learning model 2340.

The first continuity learning model 2330 is a model trained to determine an output text of the ASR model 2310 using a speech signal obtained at a past time point and text history information detected from the speech signal. In an embodiment of the disclosure, the first continuity learning model 2330 may determine the text corresponding to the speech signal by comparing the speech signal received from the user through the device 1000 and one or more text candidates converted through the ASR model 2310 with speech recognition result history information previously stored in the database.

The second continuity learning model 2340 is a model trained to obtain text interpretation result information output from the NLU model 2320, using a text and text interpretation history information at a past time. In an embodiment of the disclosure, the second continuity learning model 2340 may determine the text interpretation result information corresponding to the text by comparing at least one text interpretation result candidate that the NLU model 2320 outputs by interpreting the text with text interpretation result history information previously stored in the database.

In operation S810, the device 1000 transmits user account information and device identification information (e.g., device ID) to the server 2000.

In operation S820, the device 1000 determines whether the speech recognition model 1300a of the device 1000 is updated based on the user account information and the device identification information.

In operation S830, the server 2000 transmits the latest version of update data regarding the speech recognition model 1300a to the device 1000.

In operation S840, the device 1000 updates the speech recognition model 1300a to the latest version.

In operation S850, the device 1000 trains a weight of a speech recognition result using the continuity learning model 1300b.

Operations S810 to S850 are respectively the same as or similar to operations S710 to S750 illustrated in FIG. 7, and thus redundant descriptions may not be repeated.

In operation S860, the device 1000 transmits weight training result information to the server 2000 through the continuity learning model 1300b. In an embodiment of the disclosure, the device 1000 may update the continuity learning model 1300b based on a training result. The device 1000 may transmit a weight training result of the continuity learning model 1300b and update information of the continuity learning model 1300b to the server 2000. In an embodiment of the disclosure, the device 1000 may transmit the user account information and the device identification information (e.g., device ID) to the server 2000 together with a data file of the updated continuity learning model 1300b.

In operation S870, the server 2000 synchronizes the continuity learning model 2300b with the continuity learning model 1300b of the device 1000, using the received weight training result information.

The device 1000 including the speech recognition model 1300a and the continuity learning model 1300b may recognize the user's existing pronunciation, intonation, intonation, accent, or dialect, even when the speech recognition model 1300a is updated by the server 2000. However, because the continuity learning model 1300b is stored in the memory 1300 (see FIG. 4) inside the device 1000 in the form of on device, when the user disposes the device 1000 by losing the device 1000 or purchasing a new device, a problem in that continuity is not maintained may occur. In particular, when the new device is purchased, there is a problem in that the pronunciation, intonation, intonation, accent, or dialect may not be recognized, which deteriorates the efficiency and accuracy of a speech recognition function.

In the embodiment shown in FIG. 8, the device 1000 may transmit updated information as a result of training through the continuity learning model 1300b to the server 2000, thereby maintaining continuity as it is and improving the accuracy of speech recognition result, even when the user loses the device 1000 or purchases a new device. Accordingly, an embodiment of the disclosure may provide the speech recognition model 1300a specialized to the user regardless of which device is used.

A program executed by the device 1000 described in the disclosure may be implemented by a hardware component, a software component, and/or a combination of the hardware component and the software component. A program may be executed by any system capable of executing computer-readable instructions.

Software may include a computer program, a code, an instruction, or a combination of one or more thereof, and may configure a processing device to operate as desired or independently or collectively instruct the processing device.

Software may be implemented as a computer program including an instruction stored in a non-transitory computer-readable storage media. Examples of the computer-readable recording medium may include magnetic storage media (e.g., read-only memory (ROM), random-access memory (RAM), floppy disks, and hard disks) and optical recording media (e.g., compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

The computer-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

A program according to embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the device or an electronic market (e.g., Google Play Store or App Store). For the electronic distribution, at least a part of the software program may be stored in a storage medium or temporarily generated. In this case, the storage medium may be a storage medium of a server in the manufacturer, the server of the electronic market, or a relay server that temporarily stores a software program.

The computer program product may include a storage medium of a server or a storage medium of a device in a system including a server and a device. Alternatively, when there is a third device (e.g., a smart phone) communicating with a server and a device, the computer program product may include a storage medium of the third device. Alternatively, the computer program product may include a software program transmitted from the server to the device or the third device or from the third device to the device.

In this case, one of the server, the device, and the third device may execute the method according to embodiments of the disclosure by executing the computer program product. Alternatively, two or more of the server, the device, and the third device may execute the computer program product to execute the method according to the embodiments of the disclosure in a distributed manner.

For example, the server may execute the computer program product stored in the server to control the device communication-connected with the server to perform the method according to the embodiments of the disclosure.

In another example, the third device may execute the computer program product to control the device communicating with the third device to perform the method according the embodiment of the disclosure.

When the third device executes the computer program product, the third device may download the computer program product from the server and execute the downloaded computer program product. Alternatively, the third device may execute a computer program product provided in a preloaded state to execute the method according to the disclosed embodiments.

While the embodiments of the disclosure have been illustrated and described with reference to various example embodiments, it will be understood that the various example embodiments are intended to be illustrative, not limiting. It will be further understood by those skilled in the art that various modifications and changes may be possible from the foregoing disclosure. For example, even when described techniques are performed in a sequence different from the described method and/or components such as computer systems, modules, etc., are combined or connected differently from the described method, or replaced with other components or equivalents, an appropriate result may be achieved. Therefore, it will be understood that various changes in form and detail may be made without departing from the true spirit and full scope of the disclosure, including the appended claims and their equivalents.

What is claimed is:

1. A method in which a device recognizes a speech input, the method comprising:
   receiving the speech input;
   obtaining one or more text candidates comprising a character string in which it is predicted that the speech input is to be converted by recognizing the speech input using an automatic speech recognition (ASR) model;
   calculating a similarity between the speech input and each of a plurality of speech signals previously stored in a database;
   identifying a speech signal for which the calculated similarity exceeds a predetermined threshold, from among the plurality of speech signals;
   extracting, from the database, text history information corresponding to the identified speech signal from among a plurality of text history information previously stored in the database; and
   performing training to adjust a weight of each of the one or more text candidates using the extracted text history information.

2. The method of claim 1, wherein the plurality of text history information is obtained by converting the plurality of speech signals using the ASR model, and
   wherein the plurality of speech signals are respectively paired with the plurality of corresponding text history information and stored in the database.

3. The method of claim 1, further comprising determining, through the training, a text output by converting the speech input.

4. The method of claim 3, further comprising:
   obtaining at least one text interpretation result candidate by interpreting the output text using a natural language understanding (NLU) model;
   extracting text interpretation history information corresponding to the text from among a plurality of text interpretation result history information, by comparing the obtained at least one text interpretation result candidate with the plurality of text interpretation result history information previously stored in the database;
   training a weight for obtaining text interpretation result information from the text through the NLU model, using the extracted text interpretation history information; and
   updating the NLU model using a result of the training.

5. The method of claim 4, wherein the database stores a plurality of texts previously obtained and a plurality of text interpretation history information obtained by interpreting the plurality of texts using the NLU model, and
   wherein the plurality of texts are respectively paired with the plurality of corresponding text interpretation history information and stored in the database.

6. The method of claim 5, wherein the extracting of the text interpretation history information corresponding to the text comprises:

calculating a similarity between the text and each of the plurality of texts previously stored in the database;

identifying a text for which the calculated similarity exceeds a specified threshold, from among the plurality of texts; and extracting the text interpretation history information paired with the identified text from among the plurality of text interpretation history information.

7. A device configured to recognize a speech input, the device comprising:

a speech input interface comprising circuitry configured to receive the speech input;

a database configured for storing speech recognition result history information comprising a plurality of speech signals received prior to the speech input being received and a plurality of text history information respectively corresponding to the plurality of speech signals;

a memory storing a program comprising one or more instructions; and at least one processor configured to execute the one or more instructions of the program stored in the memory, and individually and/or collectively configured to:

receive the speech input from the speech input interface;

obtain one or more text candidates comprising a character string in which it is predicted that the speech input is to be converted by recognizing the speech input using an automatic speech recognition (ASR) model;

calculate a similarity between the speech input and each of the plurality of speech signals stored in the database, identify a speech signal for which the calculated similarity exceeds a predetermined threshold, from among the plurality of speech signals, extract, from the database, text history information corresponding to the identified speech signal from among the plurality of text history information stored in the database; and perform training to adjust a weight of each of the one or more text candidates using the extracted text history information.

8. The device of claim 7, wherein the plurality of text history information is to be obtained by converting the plurality of speech signals using the ASR model, and wherein the plurality of speech signals are respectively paired with the plurality of corresponding text history information and stored in the database.

9. The device of claim 7, wherein the at least one processor is configured, individually and/or collectively, to determine, through the training, a text output by converting the speech input.

10. The device of claim 9, wherein the at least one processor is configured, individually and/or collectively, to:

obtain at least one text interpretation result candidate by interpreting the output text using a natural language understanding (NLU) model;

extract text interpretation history information corresponding to the text from among a plurality of text interpretation result history information by comparing the obtained at least one text interpretation result candidate with the plurality of text interpretation result history information previously stored in the database;

train a weight for obtaining text interpretation result information from the text through the NLU model using the extracted text interpretation history information; and update the NLU model using a result of the training.

11. The device of claim 10, wherein the database stores a plurality of texts previously obtained and a plurality of text interpretation history information obtained by interpreting the plurality of texts using the NLU model, and wherein the plurality of texts are respectively paired with the plurality of corresponding text interpretation history information and stored in the database.

12. The device of claim 11, wherein the at least one processor is configured, individually and/or collectively, to:

calculate a similarity between the text and each of the plurality of texts previously stored in the database;

identify a text for which the calculated similarity exceeds a specified threshold, from among the plurality of texts; and extract the text interpretation history information paired with the identified text from among the plurality of text interpretation history information.

13. A computer program product comprising a non-transitory computer-readable storage medium, having stored thereon instructions configured to, which, when executed, cause the electronic device to perform operations comprising:

receiving a speech input;

obtaining one or more text candidates comprising a character string in which it is predicted that the speech input is to be converted by recognizing the speech input using an automatic speech recognition (ASR) model;

calculating a similarity between the speech input and each of a plurality of speech signals previously stored in a database;

identifying a speech signal for which the calculated similarity exceeds a predetermined threshold, from among the plurality of speech signals;

extracting, from the database, text history information corresponding to the identified speech signal from among a plurality of text history information previously stored in the database; and performing training to adjust a weight of each of the one or more text candidates using the extracted text history information.

* * * * *